US012106709B2

(12) United States Patent
Akimoto

(10) Patent No.: US 12,106,709 B2
(45) Date of Patent: *Oct. 1, 2024

(54) IMAGE DISPLAY DEVICE

(71) Applicant: NICHIA CORPORATION, Anan (JP)

(72) Inventor: Hajime Akimoto, Kokubunji (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,459

(22) Filed: Aug. 2, 2023

(65) Prior Publication Data

US 2023/0377514 A1 Nov. 23, 2023

Related U.S. Application Data

(63) Continuation of application No. 17/870,731, filed on Jul. 21, 2022, now Pat. No. 11,763,735, which is a (Continued)

(30) Foreign Application Priority Data

Jul. 31, 2018 (JP) ................................ 2018-144322

(51) Int. Cl.
*G09G 3/32* (2016.01)

(52) U.S. Cl.
CPC ....... *G09G 3/32* (2013.01); *G09G 2300/0426* (2013.01); *G09G 2300/0814* (2013.01); (Continued)

(58) Field of Classification Search
CPC ............... G09G 3/32; G09G 2320/043; G09G 2320/0257; G09G 2310/0202; (Continued)

(56) References Cited

U.S. PATENT DOCUMENTS 9,881,554 B2 1/2018 Meng et al.
11,763,735 B2 * 9/2023 Akimoto ............. G09G 3/3233 345/691

(Continued)

FOREIGN PATENT DOCUMENTS

CN 104103233 10/2014
JP 11-109919 4/1999

(Continued)

OTHER PUBLICATIONS

Notice of Allowance with Form PTO-892 Notice of References Cited issued by the United States Patent and Trademark Office for the U.S. Appl. No. 16/525,588, filed Jun. 1, 2020.

(Continued)

*Primary Examiner* — Andrew Sasinowski
(74) *Attorney, Agent, or Firm* — MORI & WARD, LLP

(57) ABSTRACT

An image display device includes a plurality of driving circuits disposed on a substrate, and a plurality of light emitting elements corresponding to a plurality of pixels respectively. Each of the plurality of driving circuits being configured to provide a driving current to each of the plurality of light emitting elements and to control the driving current by a pulse amplitude modulation and a pulse width modulation. The driving circuit being configured using TFTs.

15 Claims, 18 Drawing Sheets

Related U.S. Application Data continuation of application No. 17/395,466, filed on Aug. 6, 2021, now Pat. No. 11,430,381, which is a continuation of application No. 17/105,394, filed on Nov. 25, 2020, now Pat. No. 11,107,394, which is a continuation of application No. 16/525,588, filed on Jul. 30, 2019, now Pat. No. 10,885,834.

(52) U.S. Cl.
CPC ............... *G09G 2310/0202* (2013.01); *G09G 2320/0257* (2013.01); *G09G 2320/043* (2013.01); *G09G 2330/028* (2013.01)

(58) Field of Classification Search
CPC ... G09G 2300/0426; G09G 2300/0814; G09G 2330/028; G09G 3/2081; G09G 2300/0852; G09G 2300/0861; G09G 2310/0262; G09G 3/3233
See application file for complete search history.

(56) References Cited

U.S. PATENT DOCUMENTS

| | | | |
|---|---|---|---|
| 2003/0090481 | A1 | 5/2003 | Kimura |
| 2005/0212783 | A1 | 9/2005 | Kasai et al. |
| 2007/0018078 | A1 | 1/2007 | Miyazawa |
| 2010/0128021 | A1 | 5/2010 | Kang et al. |
| 2010/0289782 | A1 | 11/2010 | Yamamoto et al. |
| 2010/0328278 | A1 | 12/2010 | Ishiguro et al. |
| 2012/0033151 | A1 | 2/2012 | Toyotaka et al. |
| 2012/0086734 | A1 | 4/2012 | Kitani et al. |
| 2013/0033527 | A1 | 2/2013 | Yen |
| 2013/0106679 | A1 | 5/2013 | Chen |
| 2013/0169663 | A1 | 7/2013 | Seong et al. |
| 2014/0292745 | A1 | 10/2014 | Kikuchi et al. |
| 2014/0367633 | A1 | 12/2014 | Bibl et al. |
| 2016/0299387 | A1 | 10/2016 | Yamazaki et al. |
| 2017/0249885 | A1 | 8/2017 | Tamura |
| 2017/0365219 | A1 | 12/2017 | Lee et al. |
| 2018/0182279 | A1 | 6/2018 | Sakariya et al. |
| 2018/0268756 | A1 | 9/2018 | Kasai |
| 2020/0135092 | A1 | 4/2020 | Ahmed |

FOREIGN PATENT DOCUMENTS

| | | |
|---|---|---|
| JP | 2000-56727 | 2/2000 |
| JP | 2003-216110 | 7/2003 |
| JP | 2003-223136 | 8/2003 |
| JP | 2005-275003 | 10/2005 |
| JP | 2007-025523 | 2/2007 |
| JP | 2010-122649 | 6/2010 |
| JP | 2014-164182 | 9/2014 |
| JP | 2014-202778 | 10/2014 |
| JP | 2018-519539 | 7/2018 |
| WO | WO 2016/196390 | 12/2016 |

OTHER PUBLICATIONS

Notice of Allowance issued by the United States Patent and Trademark Office for the U.S. Appl. No. 16/525,588, filed Aug. 25, 2020.
Notice of Allowance with Form PTO-892 Notice of References Cited issued by the United States Patent and Trademark Office for the U.S. Appl. No. 17/105,394, filed May 5, 2021.
Office Action issued by the U.S. Patent and Trademark Office for the U.S. Appl. No. 17/395,466, 12-15- 2021.
Notice of Allowance issued by the United States Patent and Trademark Office for the U.S. Appl. No. 17/395,466, filed Apr. 22, 2022.
Office Action with Form PTO-892 Notice of References Cited issued by the U.S. Patent and Trademark Office for the parent U.S. Appl. No. 17/870,731, filed Nov. 1, 2022.
Notice of Allowance issued by the United States Patent and Trademark Office for the parent U.S. Appl. No. 17/870,731, filed May 5, 2023.

* cited by examiner

IMAGE DISPLAY DEVICE

CROSS-REFERENCE TO RELATED APPLICATIONS

This application is a continuation application of the U.S. patent application Ser. No. 17/870,731 filed on Jul. 21, 2022, which is a continuation application of the U.S. patent application Ser. No. 17/395,466 filed on Aug. 6, 2021, which was issued as the U.S. Pat. No. 11,430,381, which is a continuation application of the U.S. patent application Ser. No. 17/105,394 filed on Nov. 25, 2020, which was issued as the U.S. Pat. No. 11,107,394, which is a continuation application of the U.S. patent application Ser. No. 16/525,588, filed on Jul. 30, 2019, which was issued as the U.S. Pat. No. 10,885,834, which claims priority to Japanese Patent Application No. 2018-144322, filed on Jul. 31, 2018. The entire contents of these applications are incorporated herein by reference.

BACKGROUND OF THE INVENTION

Field

Embodiments described herein relate generally to an image device.

Background

It is desirable to realize a thin image display device having high luminance, a large viewing angle, high contrast, and low power consumption. A display device that utilizes a self-luminous element is being developed to meet such market needs.

A display that uses organic EL (electroluminescence (OLED)) as a self-luminous element for the display device is being practically employed and is considered to be promising; but problems include the emission lifetime and sticking at high luminance.

A micro LED is a fine light-emitting element using a Group III-V inorganic semiconductor material or the like, and is being developed as a self-luminous element for the display device to solve the problems of OLEDs described above.

To apply a micro LED to the display device and solve the problems of OLEDs, it is desirable to drive the micro LED used as the pixel with a wide dynamic range (see JP 2000-56727 A).

SUMMARY OF INVENTION

According to one aspect of present embodiment, an image display device includes a glass, a plurality of driving circuits disposed on the glass, and a plurality of light emitting elements disposed on the driving circuits respectively. The plurality of light emitting elements corresponds to a plurality of pixels respectively. Each of the plurality of driving circuits is configured to provide a driving current to each of the plurality of light emitting elements and to control the driving current by a pulse amplitude modulation and a pulse width modulation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
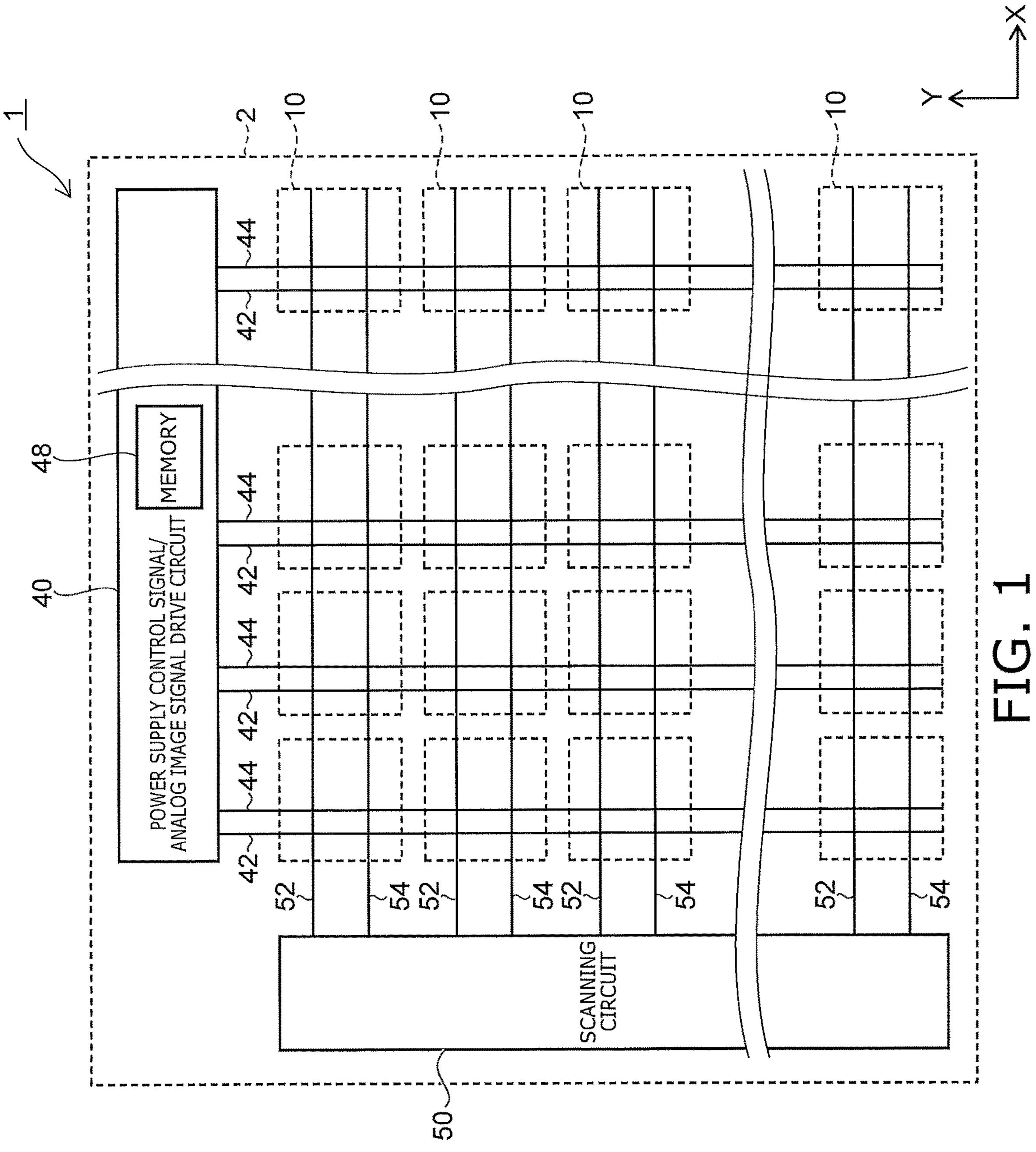
FIG. 1 is a block diagram illustrating an image display device according to a first embodiment.

The embodiments will now be described with reference to the accompanying drawings, wherein like reference numerals designate corresponding or identical elements throughout the various drawings.

Embodiments of the invention will now be described with reference to the drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with the same reference numerals; and a detailed description is omitted as appropriate.

First Embodiment

FIG. 1 is a block diagram illustrating an image display device according to a first embodiment.

As shown in FIG. 1, the image display device 1 of the embodiment includes a substrate 2 and multiple pixel circuits 10. The multiple pixel circuits 10 are provided on the substrate 2. The substrate 2 is a substantially rectangular plate. For example, the substrate 2 is formed of a synthetic resin material such as polyimide or the like, an inorganic material such as glass, etc.

In XY coordinates including an X-axis parallel to one side of the substantially rectangular substrate 2 and a Y-axis orthogonal to the X-axis, the pixel circuits 10 are arranged along the X-axis direction. Also, the pixel circuits 10 that are arranged in the X-axis direction are further arranged in the Y-axis direction. That is, in the image display device 1, the multiple pixel circuits 10 are arranged in a lattice configuration (a matrix configuration). Hereinbelow, the X-axis direction may be called the row direction; and the Y-axis direction may be called the column direction.

The necessary number of the pixel circuits 10 is arranged according to the screen resolution of the image display device 1.

The period of displaying one frame of image data in the screen formed by the pixel circuits 10 arranged in the matrix configuration may be called the vertical scanning period; and the period of the vertical scanning period divided by the number of rows of the screen may be called the horizontal scanning period. For example, in the horizontal scanning period, the voltage values for the power supply control of the pixel circuits 10 arranged in the row direction (the X-axis direction; the first direction) are set; and the voltage values for the analog image data are set. In the vertical scanning period, a scanning circuit 50 that scans the pixel circuits 10 shifts sequentially in the column direction (the Y-axis direction; the second direction).

In each pixel circuit 10, setting a voltage value by a power supply control signal and setting a voltage value by an analog image signal may be called "writing the voltage value" to the pixel circuit 10 hereinbelow.

A power supply control signal/analog image signal drive circuit 40 is provided above the top row of the pixel circuits 10 arranged in the matrix configuration. The power supply control signal/analog image signal drive circuit 40 may be provided at a position below the bottom row of the pixel circuits 10 arranged in the matrix configuration. A power supply control signal line 42 and an analog image signal line 44 extend in the column direction; and the power supply control signal line 42 and the analog image signal line 44 are provided for each column of the pixel circuits 10.

The power supply control signal/analog image signal drive circuit 40 supplies the power supply control signal to the pixel circuit 10 via the power supply control signal line 42. The power supply control signal (a second direct current voltage) is an analog signal that can have multiple voltage values. The power supply control signal/analog image signal drive circuit 40 supplies the analog image signal (a first direct current voltage) to the pixel circuit 10 via the analog image signal line 44. The analog image signal also is an analog signal that can have multiple voltage values.

As elaborated below, each pixel circuit 10 to which the power supply control signal is supplied and the voltage value is written sets a drive current based on the written voltage value. Each pixel circuit 10 to which the analog image signal is supplied and the voltage value is written sets, based on the voltage value of the analog image signal, the duration of the light emission of the pixel circuit 10 by setting a threshold voltage which is compared to a not-illustrated reference triangular wave signal (a first signal).

The power supply control signal/analog image signal drive circuit 40 may generate a not-illustrated reference triangular wave signal supplied to the pixel circuits 10 for each column. Or, a reference triangular wave circuit for the reference triangular wave signal may be provided separately below the bottom row of the matrix of the pixel circuits 10. For example, the power supply control signal/analog image signal drive circuit 40 or the reference triangular wave circuit may distribute a reference triangular wave supplied from outside these circuits to the columns of the pixel circuits 10.

The power supply control signal/analog image signal drive circuit 40 may include memory 48. The memory 48 can store the luminance settings for the multiple voltage values possible when using the power supply control signal and the luminance settings for the multiple voltage values possible when using the analog image signal. The relationships between the luminance settings and these voltage values can be adjusted and set by visually confirming the luminance of the light-emitting element included in the pixel circuit 10, etc. The power supply control signal/analog image signal drive circuit 40 with memory 48 can be referred to as signal voltage writing circuit or correction circuit. γ-correction can be performed by appropriately setting the relationships between the luminance settings and the voltage values. One advantage of the digital PWM (Pulse Width Modulation) technique is that γ-correction of the signal is possible even though the gradation characteristics are linear. For example, the memory 48 is formed of an electrically reprogrammable memory circuit, etc.

The scanning circuit 50 is provided in a column to the left of the column at the leftmost end of the pixel circuits 10 arranged in the matrix configuration. The scanning circuit 50 may be provided in a column to the right of the column at the rightmost end of the pixel circuits 10 arranged in the matrix configuration. A first scanning line 52 and a second scanning line 54 from the scanning circuit 50 are provided every row of the pixel circuits 10. The first scanning line 52 and the second scanning line 54 extend in the row direction.

The first scanning line 52 supplies a first scanning signal which is a digital signal to select, in the row direction, the pixel circuits 10 written with the desired voltage values by the voltage control signals and the analog image signals. The reference triangular wave signal is supplied to the selected pixel circuits 10; and the light-emitting elements of the pixel circuits 10 emit light according to the luminance settings based on the written voltages. The second scanning line 54 supplies a second scanning signal which is a digital signal for selecting the pixel circuits 10 in the row direction when writing the voltage value by the analog image signal.

The first scanning signal and the second scanning signal that correspond to the same row have complimentary logical values. That is, the second scanning signal is the low level when the first scanning signal is the high level; and the second scanning signal is the high level when the first scanning signal is the low level.

Every horizontal scanning period, the period in which the second scanning signal is the high level shifts sequentially to a period in which the second scanning signal of the next adjacent row is the high level.

Figure 2:
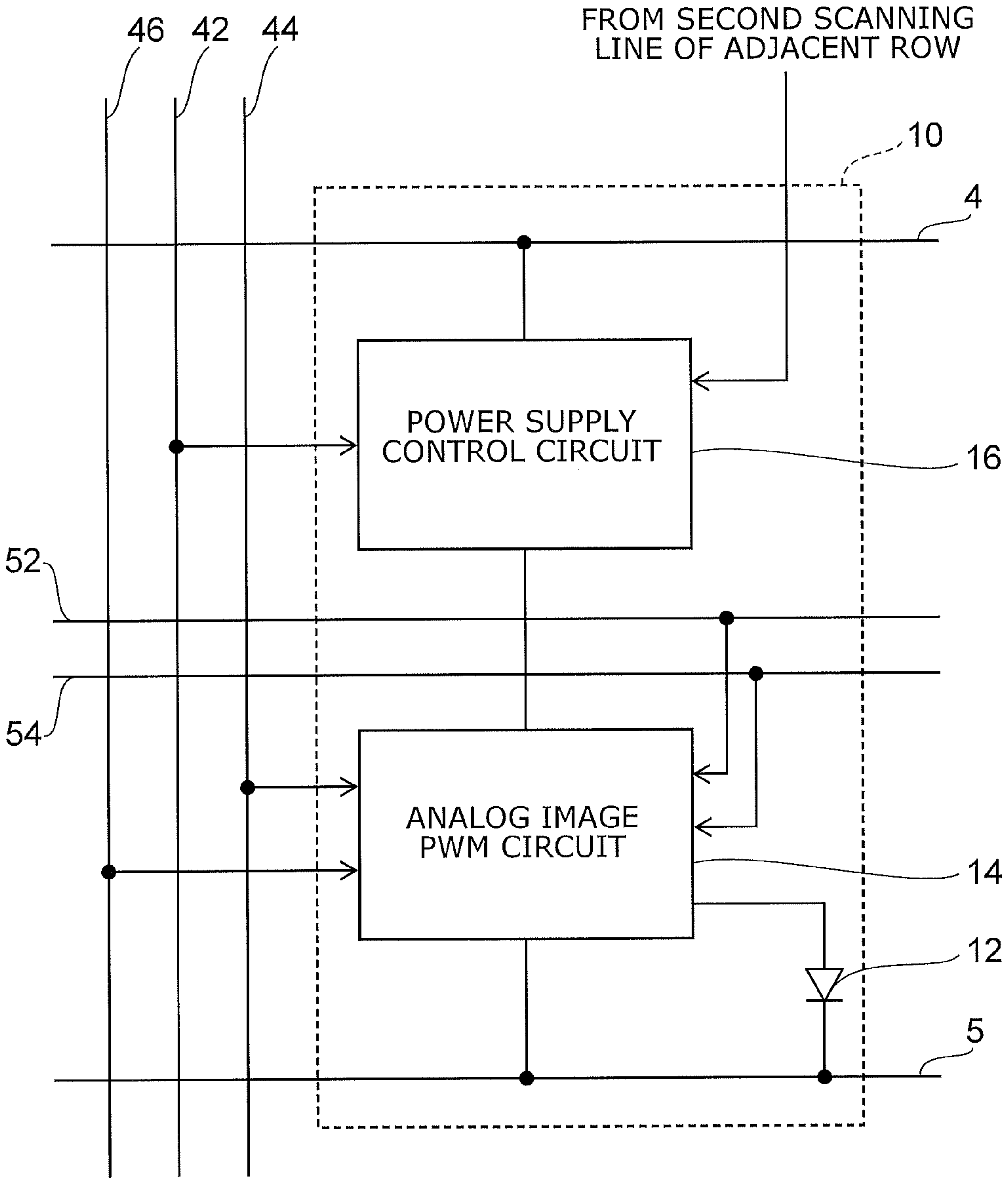
FIG. 2 is a block diagram illustrating a portion of the image display device of the first embodiment.

FIG. 2 is a block diagram illustrating a portion of the image display device of the first embodiment.

FIG. 2 is a block diagram of a specific example of the pixel circuit 10.

As shown in FIG. 2, the pixel circuit 10 includes a light-emitting element 12, an analog image PWM circuit (a PWM section) 14, and a power supply control circuit (a PAM section) 16. The light-emitting element 12 is connected to the output of the analog image PWM circuit 14. The analog image PWM circuit 14 and the power supply control circuit 16 are connected in series between a power supply line (a first power supply line) 4 and a ground wire (a second power supply line) 5. In the example, the power supply control circuit 16 is connected on the high potential side of the analog image PWM circuit 14. Hereinafter the analog image PWM circuit 14 and the power supply control circuit 16 are collectively referred to as a driving circuit.

Hereinbelow, unless otherwise specified, "voltage" and "voltage value" refer to the "voltage" and the "voltage value" when the voltage value of the ground wire 5 and a common ground wire 5*a* described below are used as the reference value (=0 V).

The light-emitting element 12 is connected between the ground wire 5 and the output of the analog image PWM circuit 14. Favorably, the light-emitting element 12 is an inorganic semiconductor light-emitting element. In such a case, for example, the light-emitting element 12 is formed of a Group III-V compound semiconductor or the like. The light-emitting element 12 may be an electro-emissive quantum dot (QD) element or EL quantum dot (QD) element. Although the light-emitting element 12 may be an organic electroluminescence element, the light-emitting element 12 described below is an inorganic semiconductor light-emitting element unless otherwise specified.

The analog image PWM circuit (a first circuit) 14 is connected between the power supply control circuit 16 and the ground wire 5. The analog image PWM circuit 14 is connected to the analog image signal line 44 and a reference triangular wave signal line 46. The analog image signal line 44 and the reference triangular wave signal line 46 extend in the column direction. The analog image PWM circuit 14 is connected to the first scanning line 52 and the second scanning line 54. The first scanning line 52 and the second scanning line 54 extend in the row direction.

The analog image PWM circuit 14 can cause the light-emitting element 12 to emit light when the first scanning signal supplied via the first scanning line 52 is the high level. The period in which the light-emitting element 12 emits light is determined based on the reference triangular wave signal supplied via the reference triangular wave signal line 46 and the voltage value written to the analog image PWM circuit 14. The interval at which the light-emitting element 12 emits light is determined based on the interval of the reference triangular wave signal.

In the analog image PWM circuit 14, the light emission of the light-emitting element 12 is stopped when the first scanning signal is the low level.

In the analog image PWM circuit 14, the voltage value of the analog image signal supplied via the analog image signal line 44 is written when the second scanning signal supplied via the second scanning line 54 is the high level. The writing of the voltage value of the analog image signal is stopped when the second scanning signal is the low level.

The power supply control circuit (a second circuit) 16 is connected between the power supply line 4 and the analog image PWM circuit 14. The power supply control circuit 16 is connected to the second scanning line 54 of the pixel circuit of the adjacent row to be scanned previously. The power supply control circuit 16 is connected to the power supply control signal line 42. The power supply control signal line 42 extends in the column direction.

In the power supply control circuit 16, the voltage value of the power supply control signal supplied via the power supply control signal line 42 is written when the second scanning signal supplied via the second scanning line 54 of the row adjacent to the row of the pixel circuit 10 of the power supply control circuit 16 is the high level.

Hereinbelow, positive logic is used in the description so that the first scanning signal and the second scanning signal permit or perform the prescribed operation when at the high level and prohibit or stop the prescribed operation when at the low level. Configurations described using positive logic are used unless otherwise specified; but the logic can be modified to negative logic easily by changing the polarities of the transistors, etc.; and positive logic and negative logic can coexist.

The configuration of the pixel circuit 10 will now be described in more detail.

Figure 3:
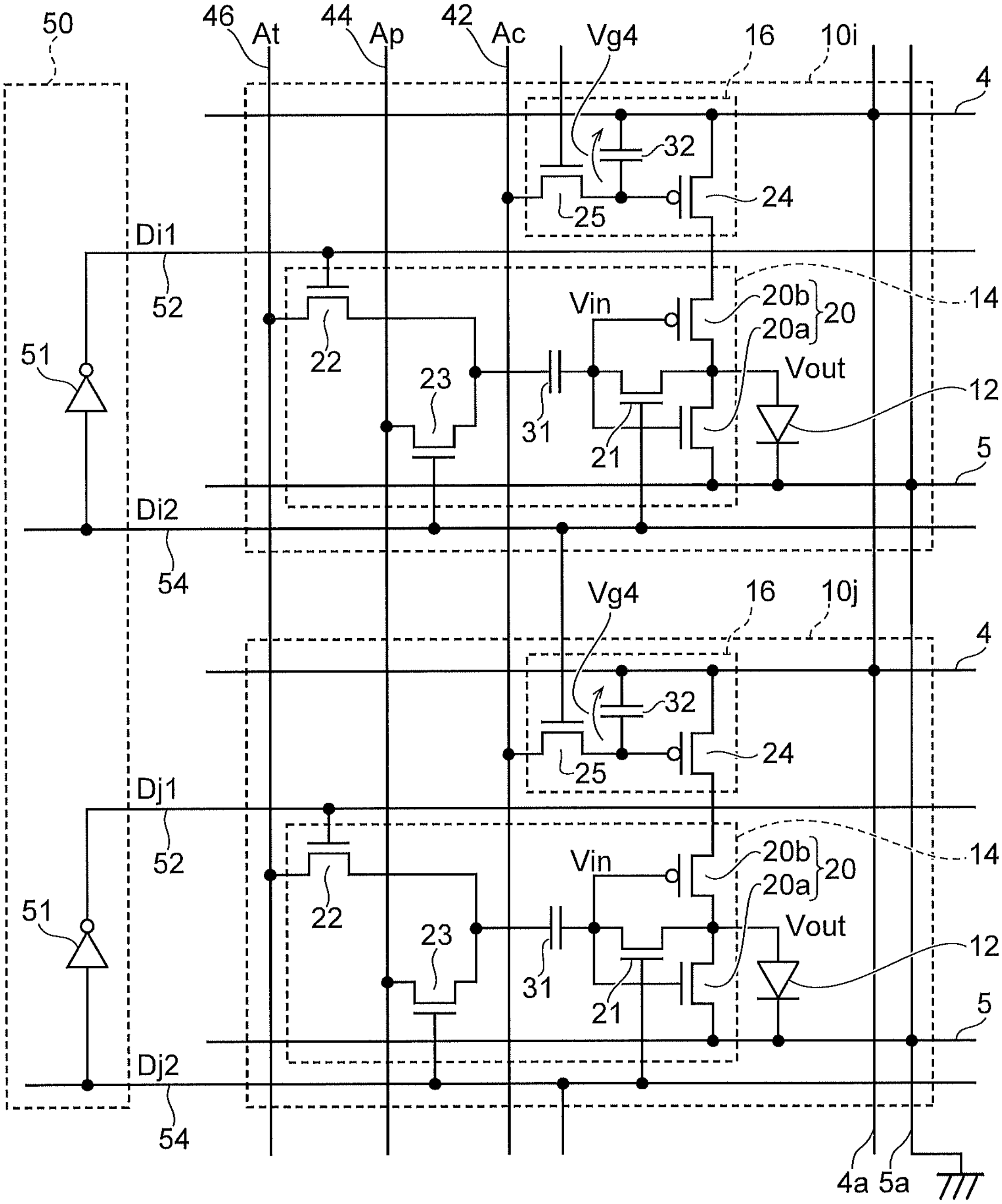
FIG. 3 is a circuit diagram illustrating a portion of the image display device of the first embodiment.

FIG. 3 is a circuit diagram illustrating a portion of the image display device of the first embodiment.

FIG. 3 shows a specific circuit example of the pixel circuit 10. FIG. 3 shows pixel circuits 10*i* and 10*j* of the same column and two adjacent rows. In FIG. 3, the circuit configurations of the pixel circuits 10*i* and 10*j* of the two rows are the same; the same components are marked with the same reference numerals; and a detailed description is omitted as appropriate.

As shown in FIG. 3, the analog image PWM circuit 14 includes an inverter 20, a first transistor 21, a second transistor 22, a third transistor 23, and a first capacitor 31.

The inverter 20 includes transistors 20*a* and 20*b*. Main electrodes of the transistors 20*a* and 20*b* are connected in series; and the control electrodes of the transistors 20*a* and 20*b* are connected to each other. The transistor 20*a* is an n-type transistor; and the transistor 20*b* is a p-type transistor. The anode electrode of the light-emitting element 12 is connected to the output of the inverter 20. The cathode electrode of the light-emitting element 12 is connected to the ground wire 5. Hereinbelow, the polarities of the transistors are the n-type unless otherwise specified.

The main electrodes of the first transistor 21 are connected between the input and the output of the inverter 20. The control electrode of the first transistor 21 is connected to the second scanning line 54.

One electrode of the first capacitor (a first capacitance element) 31 is connected to the input of the inverter 20. The other electrode of the first capacitor 31 is connected to one main electrode of the second transistor 22 and one main electrode of the third transistor 23.

The other main electrode of the second transistor 22 is connected to the reference triangular wave signal line (a first signal line) 46. The control electrode of the second transistor 22 is connected to the first scanning line 52. The other main electrode of the third transistor 23 is connected to the analog image signal line (a second signal line) 44. The control electrode of the third transistor 23 is connected to the second scanning line 54.

By setting the first transistor 21 and the third transistor 23 simultaneously to ON, the input and output of the inverter 20 are short-circuited; and the voltage of an analog image signal Ap is applied to the first capacitor 31. The voltage when short-circuiting the input and output of the inverter 20 is equal to an inverted intermediate voltage. The inverted intermediate voltage is the voltage of the threshold of the inverter 20; and the output of the inverter 20 rises when the voltage that is input is lower than the inverted intermediate voltage. The inverter 20 and the first capacitor 31 operate as a comparator. The comparator operates with the voltage value of the analog image signal Ap as a threshold voltage.

For example, in the case where the analog image signal Ap that has a voltage value equal to the inverted intermediate voltage is input to the first capacitor 31, the output of the inverter 20 rises when the voltage value of a reference triangular wave signal At becomes equal to the inverted intermediate voltage. The inverter 20 and the first capacitor 31 operate as a comparator having a threshold voltage corresponding to the voltage value of the analog image signal Ap even in the case where the voltage value of the analog image signal Ap is lower or higher than the inverted intermediate voltage.

The power supply control circuit 16 includes a fourth transistor 24, a fifth transistor 25, and a second capacitor 32.

The fourth transistor 24 is a p-type transistor. The main electrodes of the fourth transistor 24 are connected between the power supply line 4 and a main electrode of the transistor 20*b* of the inverter 20. The control electrode of the fourth transistor 24 is connected to one main electrode of the fifth transistor 25. The other main electrode of the fifth transistor 25 is connected to the power supply control signal line 42. The control electrode of the fifth transistor 25 is connected to the second scanning line 54 of the row of the pixel circuit 10*i* adjacent to the row of the pixel circuit 10*j* of the fifth transistor 25.

The second scanning line 54 also is connected to the control electrodes of the first transistor 21 and the third transistor 23 of the pixel circuit 10*i* adjacent to the pixel circuit 10*j*. Although not illustrated, the second scanning line 54 of the pixel circuit 10*j* is connected to the control electrode of the fifth transistor 25 of the adjacent pixel circuit (not illustrated) below the pixel circuit 10*j* in the column direction.

When the fifth transistor 25 is switched ON, the voltage across the second capacitor (a second capacitance element) 32 which is set to the voltage value of a power supply control signal Ac is applied to the control terminal of the fourth transistor 24. The current value of the fourth transistor 24 is set based on the voltage across the second capacitor 32; and the current that is set is supplied to the analog image PWM circuit 14.

The power supply lines 4 of each row are connected to a common power supply line 4*a* extending in the column direction. The ground wires 5 of each row are connected to the common ground wire 5*a* extending in the column direction. A direct current voltage is applied between the common power supply line 4*a* and the common ground wire 5*a*.

The scanning circuit 50 includes an inverter 51 for each row. The second scanning line 54 that corresponds to each row is connected to the input of the inverter 51 of the row; and the first scanning line 52 that corresponds to each row is connected to the output of the inverter 51 of the row.

For example, the scanning circuit 50 sequentially outputs second scanning signals Di2 and Dj2 to select the rows downward from above. In the drawing, the scanning circuit 50 supplies the second scanning signal Di2 of the high level to the pixel circuit 10*i* of the upper row, and subsequently switches the second scanning signal Di2 to the low level and supplies the second scanning signal Dj2 of the high level to the pixel circuit 10*j* of the lower row. The horizontal scanning period includes the period in which the second scanning signal Di2 or Dj2 is the high level and includes the period in which the scanning circuit 50 outputs the second scanning signal Di2 or Dj2 by switching every row.

Although elaborated below, a voltage value that corresponds to the power supply control signal is written to the power supply control circuit 16 of the object pixel circuit 10*j* by the second scanning signal Di2 of the row adjacent to the row of the object pixel circuit 10*j* selecting the power supply control circuit 16. After the second scanning signal Di2 of the adjacent row becomes the low level, the second scanning signal Dj2 of the row of the object pixel circuit 10*j* becomes the high level. Thereby, the analog image PWM circuit 14 of the object pixel circuit 10*j* is selected; and the voltage value of the analog image signal is written.

The period in which the second scanning signal Di2 or Dj2 of each row is the high level is determined by the horizontal scanning period. The period in which the second scanning signal Di2 or Dj2 is the high level is set to a period equal to or shorter than the horizontal scanning period. More specifically, the period of the second scanning signal Di2 or Dj2 is determined based on the period for the voltages of the input terminals of the first capacitor 31 and the second capacitor 32 to become substantially equal to the voltage value of the analog image signal and the voltage value of the power supply control signal.

The first scanning line 52 of each row outputs a first scanning signal Di1 or Dj1 having a logical value that is the reverse of the second scanning signal Di2 or Dj2. That is, the reference triangular wave signal At is input to the pixel circuit 10*i* or 10*j* of each row in the period in which the writing of the voltage value of the power supply control signal Ac and the voltage value of the analog image signal Ap is not performed.

For example, the analog image PWM circuit 14 and/or the power supply control circuit 16 of the pixel circuit 10 described above is formed using a low-temperature polycrystalline silicon (LTPS) process, an oxide semiconductor manufacturing process, etc. The transistors that are included in the analog image PWM circuit 14 and the power supply control circuit 16 are thin film transistors (TFTs).

The scanning circuit 50 also may be configured using TFTs.

The power supply control signal/analog image signal drive circuit 40 may be a digital-analog mixed circuit including a digital-analog converter, the memory 48, etc.; therefore, it is favorable for the power supply control signal/analog image signal drive circuit 40 to be provided as an independent integrated circuit for driving.

The image display device 1 is formed by forming the light-emitting element 12 on a GaN semiconductor crystal, separating the light-emitting element 12 from the substrate for crystal growth, and transferring (Mass-Transferring) the light-emitting element 12 onto the substrate 2 described above where the pixel circuit 10 is formed.

The operation of the image display device 1 of the embodiment will now be described.

Figure 4:
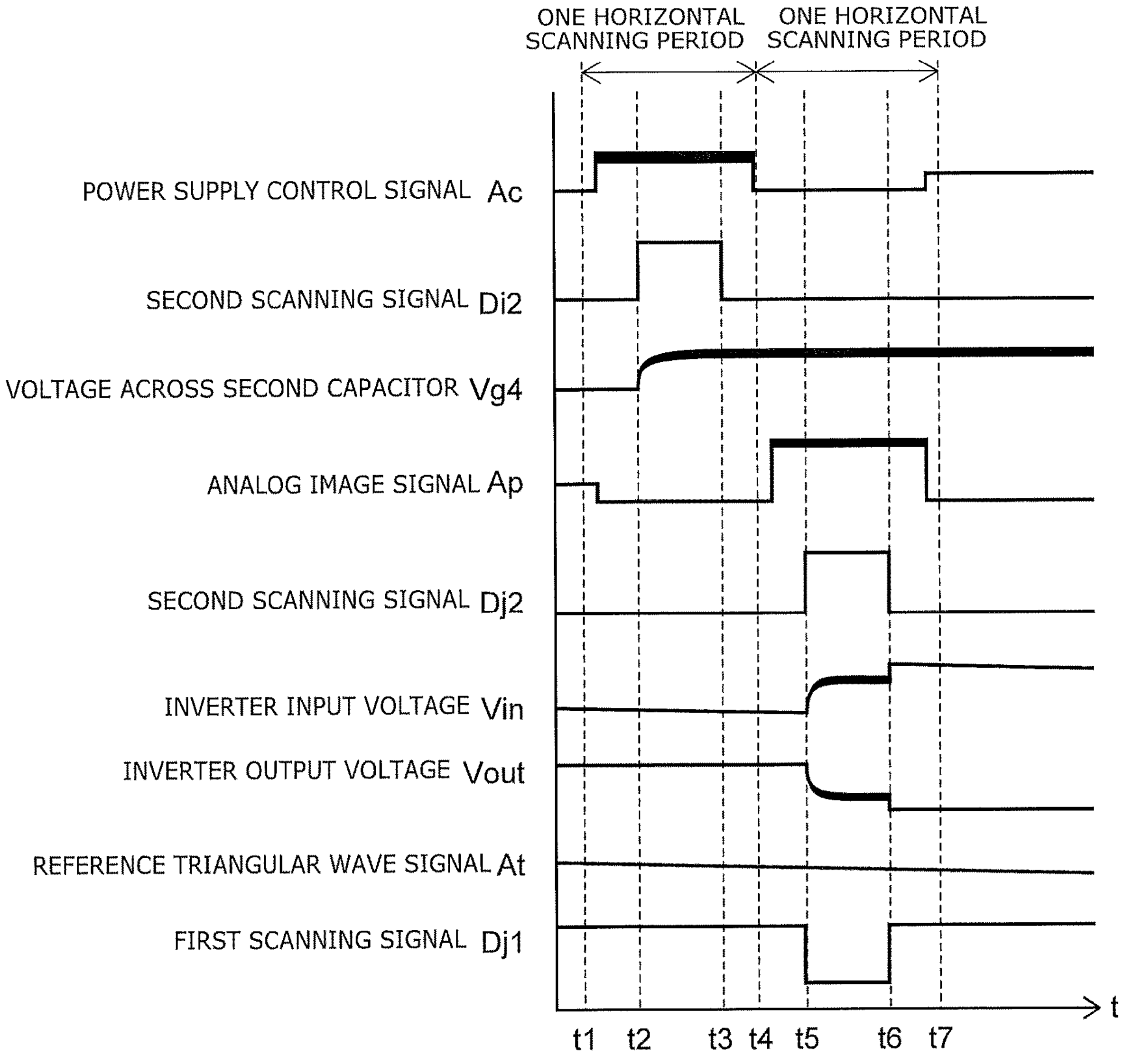
FIG. 4 is an example of a timing chart for describing the operation of the image display device of the first embodiment.

FIG. 4 is an example of a timing chart for describing the operation of the image display device of the first embodiment.

FIG. 4 shows the operation waveform of each component of the pixel circuit 10 in two horizontal scanning periods.

The figure of the uppermost level of FIG. 4 shows the temporal change of the power supply control signal Ac supplied to the power supply control signal line 42.

The figure of the second level of FIG. 4 shows the temporal change of the second scanning signal Di2 of the second scanning line 54 of the adjacent row above the row of the object pixel circuit 10*j* (FIG. 3). The fifth transistor 25 of the object pixel circuit 10*j* is switched ON when this second scanning signal Di2 is the high level.

The figure of the third level of FIG. 4 shows the temporal change of the voltage across the second capacitor 32 of the object pixel circuit 10*j*.

The figure of the fourth level of FIG. 4 shows the temporal change of the analog image signal Ap supplied to the analog image signal line 44.

The figure of the fifth level of FIG. 4 shows the temporal change of the second scanning signal Dj2 of the second scanning line 54 of the row of the object pixel circuit 10*j*. The first transistor 21 and the third transistor 23 of the object pixel circuit 10*j* are switched ON when this second scanning signal Dj2 is the high level.

The figure of the sixth level of FIG. 4 shows the temporal change of an input voltage Vin of the inverter 20 of the object pixel circuit 10*j*.

The figure of the seventh level of FIG. 4 shows the temporal change of an output voltage Vout of the inverter 20 of the object pixel circuit 10*j*. This voltage waveform is the voltage waveform of the anode electrode of the light-emitting element 12.

The figure of the eighth level of FIG. 4 shows the temporal change of the reference triangular wave signal At. The interval of the reference triangular wave signal At is set according to the vertical scanning period, is sufficiently longer than the horizontal scanning period, and therefore has a gentle gradient.

The figure of the lowermost level of FIG. 4 shows the temporal change of the first scanning signal Dj1 supplied from the first scanning line 52 of the row of the object pixel circuit 10*j*. When this first scanning signal Dj1 is the high level, the second transistor 22 of the object pixel circuit 10*j* is switched ON; and when this first scanning signal Dj1 is the low level, the second transistor 22 of the object pixel circuit 10*j* is switched OFF.

In the horizontal scanning period between t1 to t4 of the row adjacent to the row of the object pixel circuit 10*j*, the power supply control signal Ac has a voltage value having a set value. At this time, the voltage value is applied to a main electrode of the fifth transistor 25 of the object pixel circuit 10*j*.

At the time t2, the second scanning signal Dig of the adjacent row above the row of the object pixel circuit 10*j* becomes the high level. The fifth transistor 25 of the object pixel circuit 10*j* is switched ON thereby.

By switching the fifth transistor 25 ON, the second capacitor 32 is charged by the power supply control signal Ac. At this time, the voltage across the second capacitor 32 is the writing voltage of the power supply control circuit 16 of the pixel circuit 10*j*.

Between the time t4 to t7, the voltage value of the power supply control signal Ac is modified to a voltage value for the pixel circuit (not illustrated) of the adjacent row below the row of the object pixel circuit 10*j*.

At the time t3, the second scanning signal Dig already is the low level; and the fifth transistor 25 of the pixel circuit 10*j* of the object row is OFF at and after the time t3.

On the other hand, between the time t4 to t7, the analog image signal Ap is set to a voltage value written to the analog image PWM circuit 14 of the object pixel circuit 10*j*.

The second scanning signal Dj2 of the row of the object pixel circuit 10*j* becomes the high level at a time t5. The first transistor 21 and the third transistor 23 of the pixel circuit 10*j* are switched ON thereby.

By switching the first transistor 21 and the third transistor 23 of the pixel circuit 10*j* ON at the time t5, the first capacitor 31 is charged by the voltage value of the analog image signal Ap. Because the input and the output of the inverter 20 are short-circuited by the first transistor 21, the input voltage Vin of the inverter 20 approaches the inverted intermediate voltage value of the inverter 20 which is a constant value. At a time t6, the input voltage Vin of the inverter 20 becomes the inverted intermediate voltage value. Accordingly, the voltage across the first capacitor 31 approaches a voltage value based on the voltage value of the analog image signal Ap. Between the time t5 to t6, the light-emitting element 12 is not ON because the output voltage of the inverter 20 is lower than the threshold voltage of the light-emitting element 12.

Between the time t5 to t6, the first scanning signal Dj1 is the low level; and the second transistor 22 of the pixel circuit 10*j* of the object row is OFF.

From the time t6 onward, the first scanning signal Dj1 becomes the high level; and the second transistor 22 of the pixel circuit 10*j* is switched ON.

At the time t6, the first capacitor 31 has the voltage value set by the analog image signal Ap. If the voltage value of the reference triangular wave signal At falls below this voltage from the time t6 onward, the output of the inverter 20 rises; and the light-emitting element 12 emits light when the output of the inverter exceeds the threshold voltage of the light-emitting element 12.

Figure 5:
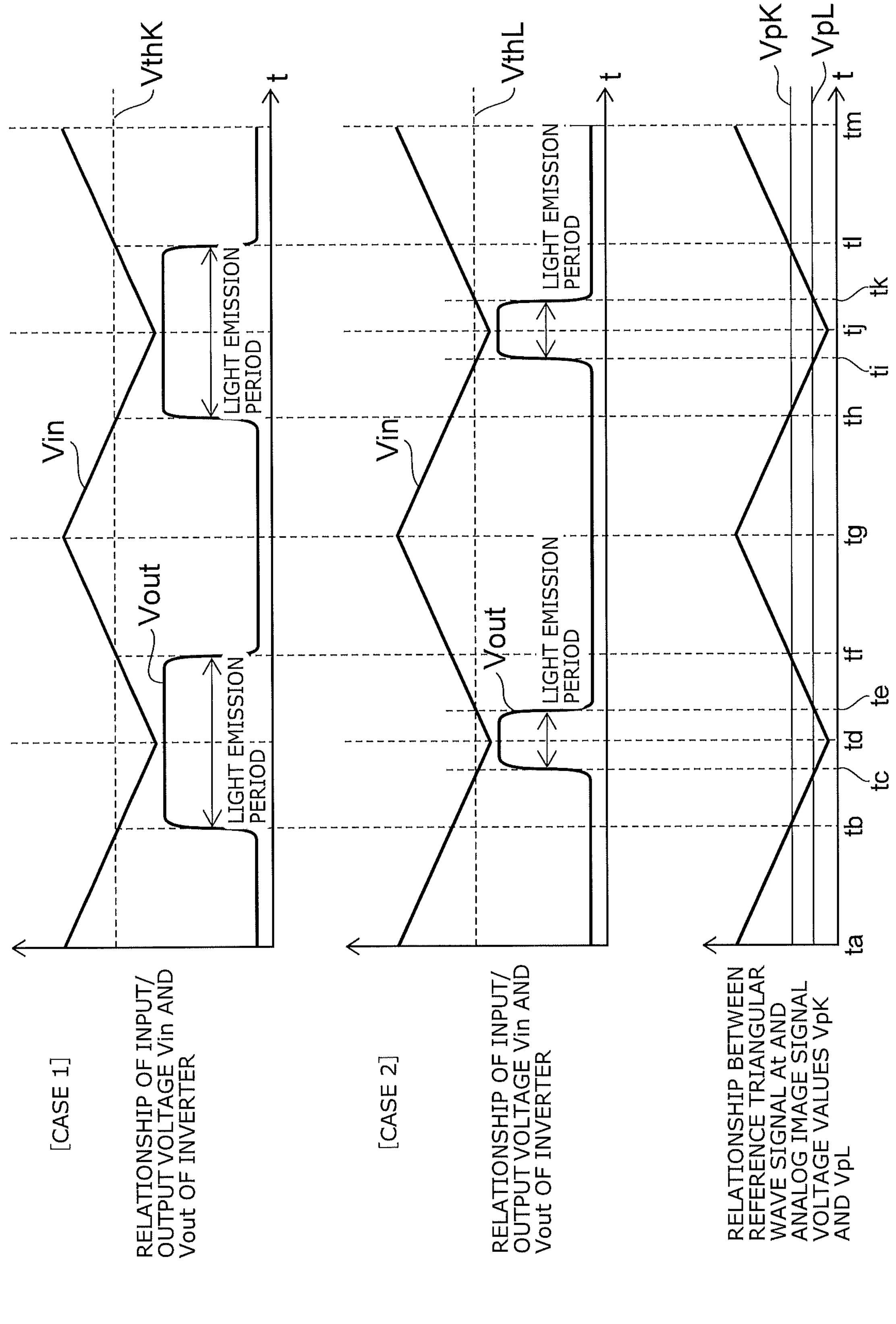
FIG. 5 is an example of a timing chart for describing the operation of the image display device of the first embodiment.

FIG. 5 is an example of a timing chart for describing the operation of the image display device of the first embodiment.

FIG. 5 shows a timing chart having a time axis of a period longer than that of FIG. 4. In the example, time ta to tm illustrates one vertical scanning period. For example, one vertical scanning period is a period determined by the frequency of one frame. In the case where the frequency of one frame is 60 Hz, one vertical scanning period is 1/60 (sec). In the example, the reference triangular wave signal At is a symmetric triangular wave; and the frequency is set to 2 times the frame frequency. Accordingly, the operation in the period between the time ta to tg and the operation in the period between the time tg to tm are the same; therefore, the operation in the period between the time ta to tg will now be described.

The figure of the uppermost level and the figure of the second level of FIG. 5 show the temporal change of the input voltage Vin of the inverter 20 and the temporal change of threshold voltages VthK and VthL set by the voltage value written by the analog image signal Ap.

The lowermost level of FIG. 5 shows the temporal change of the reference triangular wave signal At and voltage values VpK and VpL of analog image signals ApK and ApL.

As shown in the figure of the lowermost level of FIG. 5, the magnitudes of the reference triangular wave signal At and the voltage values VpK and VpL of the analog image signals ApK and ApL written by the second scanning signal Dj2 of the object row have the relationship VpK>VpL. Here, the case of the voltage value VpK is taken as a case 1; and the case of the voltage value VpL is taken as a case 2.

For the case 1, in the periods between time ta to tb and tf to tg when the voltage value VpK is not less than the voltage value of the reference triangular wave signal At, the output of the inverter 20 does not rise; and a current does not flow in the light-emitting element 12.

On the other hand, in the period between time tb to tf when the voltage value VpK is lower than the voltage value of the reference triangular wave signal At, the output of the inverter 20 rises; and a current flows in the light-emitting element 12.

For the case 2, in the periods between the time ta to tc and te to tg when the voltage value VpL is not less than the voltage value of the reference triangular wave signal At, the output of the inverter 20 does not rise; and the current does not flow in the light-emitting element 12.

On the other hand, in the period between the time tc to te when the voltage value VpL is lower than the voltage value of the reference triangular wave signal At, the output of the inverter 20 rises; and the current flows in the light-emitting element 12.

That is, for the case 1 as in the figure of the uppermost level of FIG. 5, the light-emitting element 12 emits light when the voltage value VpK of the analog image signal ApK is not less than the voltage value of the reference triangular wave signal At. For the case 2 as in the figure of the second level of FIG. 5, the light-emitting element 12 emits light when the voltage value VpL of the analog image signal ApL is not less than the voltage value of the reference triangular wave signal At. Because the light-emitting element 12 emits light when the voltage value of the analog image signal Ap is higher than the voltage value of the reference triangular wave signal At, the light emission period of the light-emitting element 12 can be set by the magnitude of the voltage value of the analog image signal Ap.

Because the interval of the reference triangular wave signal At is constant, the duty of the light emission period can be set; and the brightness (the luminance) can be adjusted by setting the light emission period of the light-emitting element 12 based on the voltage value of the analog image signal Ap.

In the image display device 1 of the embodiment, each pixel circuit 10 includes the power supply control circuit 16. In the power supply control circuit 16, the voltage value that is set by the power supply control signal is already written by the second scanning signal Dig of the row adjacent to the row to which the analog image signal is being written.

After the second scanning signal Dig becomes the low level, the fourth transistor 24 supplies a current to the inverter 20 according to the value of the voltage written to the second capacitor 32. In the case where the fourth transistor 24 operates in the saturated region of the MOSFET, the current that is output is determined according to the voltage across the second capacitor 32. Roughly, the output current of the fourth transistor 24 is proportional to the square of the voltage of the threshold voltage of the fourth transistor 24 subtracted from the voltage across the second capacitor 32. Even in the case where the fourth transistor 24 operates in the linear region of the MOSFET, the main current (the drain current) can be determined uniquely based on the voltage of the control electrode and the voltage of the major terminal electrode (the drain electrode).

The current that is output by the fourth transistor 24 is set by appropriately setting the voltage value of the power supply control signal Ac. The current that is set is supplied to the light-emitting element 12 via the inverter 20.

Multiple types of the current value output by the fourth transistor 24 can be set by setting multiple types of the voltage value of the power supply control signal Ac. Multiple types of the voltage value written to the analog image PWM circuit 14 also can be set; and the light-emitting element 12 can be driven by the duty corresponding to the voltage values that are set.

Although flickering of the image can be suppressed by setting the frequency of the reference triangular wave signal to be about 2 times the frame frequency, the frequency of the reference triangular wave signal is not limited to 2 times the frame frequency and can be set arbitrarily in a range in which flickering does not occur. The frequency of the reference triangular wave signal may be set without using the frame frequency as a reference. The reference triangular wave signal is not limited to a symmetric triangular wave and may be an asymmetric triangular wave, e.g., a sawtooth wave, an inverted sawtooth wave, etc.; and it is also possible to provide the γ-characteristic using a curve.

Actions and effects of the image display device 1 of the embodiment will now be described.

Figure 6:
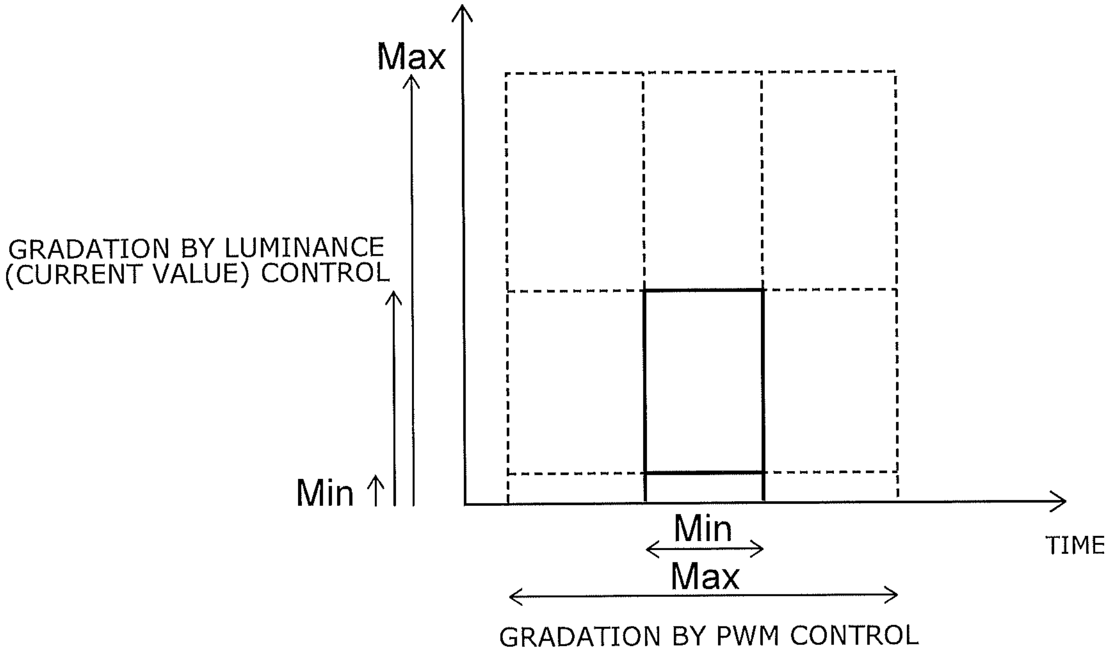
FIG. 6 is a conceptual view for describing the operation of the image display device of the first embodiment.

FIG. 6 is a conceptual view for describing the operation of the image display device of the first embodiment.

FIG. 6 shows the principle of the gradation setting of the image display device 1 of the embodiment. The horizontal axis of FIG. 6 is the time axis. The vertical axis of FIG. 6 is an axis illustrating the luminance (the current value) (amplitude).

As shown in FIG. 6, each pixel circuit 10 of the image display device 1 of the embodiment includes the analog image PWM circuit 14. Accordingly, as shown in the horizontal axis of FIG. 6, multiple levels of the period of driving the light-emitting element 12 per unit period can be set by the analog image PWM circuit 14.

Each pixel circuit 10 also includes the power supply control circuit 16. As shown in the vertical axis of FIG. 6, the luminance control (pulse amplitude modulation) can be performed by the power supply control circuit 16 setting multiple levels of the current flowing in the light-emitting element 12 in each pixel circuit 10.

For example, in the analog image PWM circuit 14, a gradation of 255 levels (256 levels including 0) can be realized by setting the voltage value (a first signal voltage value) of the analog image signal Ap to correspond to an 8-bit digital signal. Further, in the power supply control circuit 16, a gradation of 31 levels (32 levels including 0) can be realized by setting the voltage value (a second voltage value) of the power supply control signal Ac to correspond to a 5-bit digital signal. Accordingly, in the image display device 1 of the embodiment, it is possible to realize a gradation of substantially about thirteen bits.

A pixel circuit that uses an analog image PWM circuit is conventionally known. However, in the case where the TFT used to configure the pixel circuit is manufactured using LTPS technology, the gradation that can be realized is a maximum of about eight bits due to the noise of the pixel circuit (about 20 mV), constraints of the direct current voltage that can be applied to the pixel circuit (not more than about 5 V), etc.

On the other hand, the need is increasing for a thin panel having a low power consumption and a high dynamic range (HDR). Using the conventional method described above, it is difficult to realize a dynamic range having a gradation sufficient for HDR.

As described above, according to the embodiment, the gradation of about eight bits can be enlarged several bits more.

Also, in the embodiment, by using an inorganic semiconductor light-emitting element as the light-emitting element 12, compared to OLEDs, sticking is low even for high luminance; and color mixing at low luminance can be reduced. Accordingly, it is possible to realize the image display device 1 including the pixel circuit 10 capable of HDR.

Figure 7A:
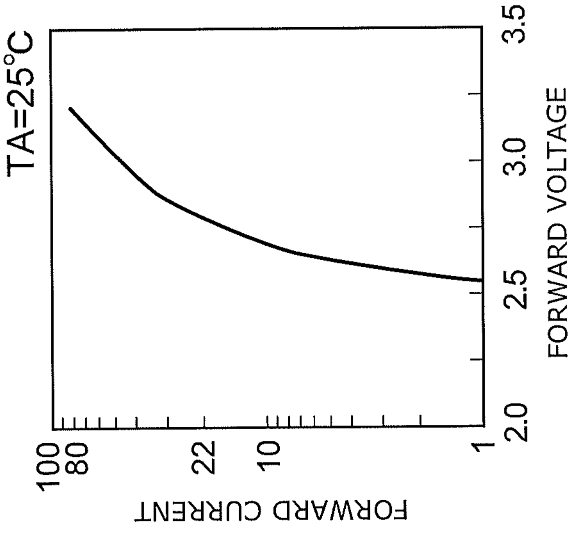
FIG. 7A to FIG. 7C are graphs showing characteristic examples of a light-emitting element.
Figure 7B:
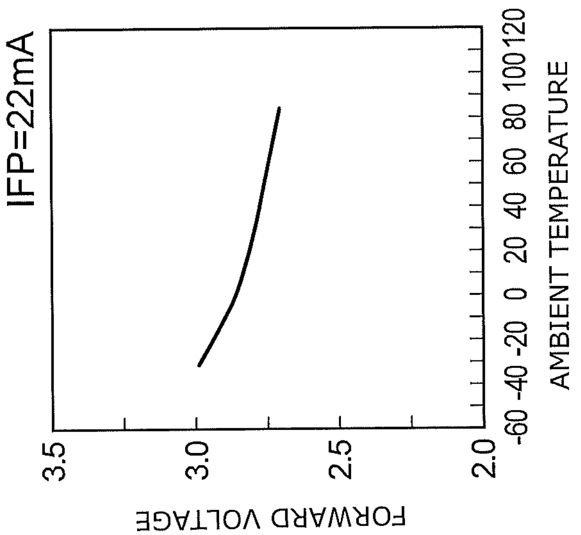
Figure 7C:
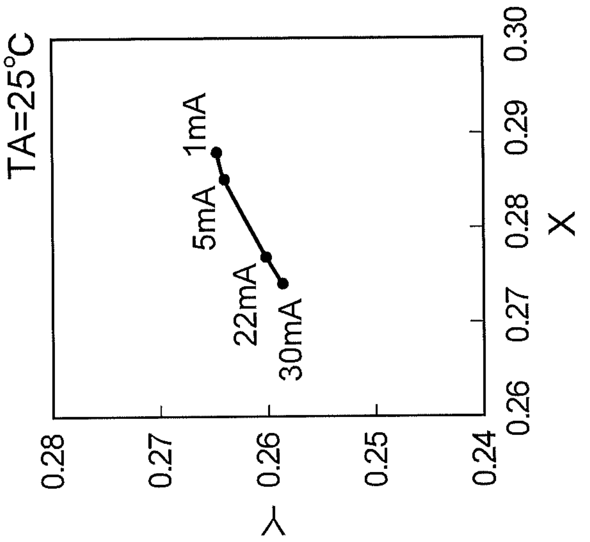

FIG. 7A to FIG. 7C are graphs showing characteristic examples of a light-emitting element.

FIG. 7A to FIG. 7C are graphs of characteristic examples of the semiconductor light-emitting element "NSSW703BT-HG" made by Nichia Corporation.

In the semiconductor light-emitting element as shown in FIG. 7A, when the forward voltage is exceeded and a current flows, the current changes greatly for a small voltage change in the low-current region. Also, as shown in FIG. 7B, the forward voltage has a temperature characteristic. Therefore, luminance control by current driving is favorable for the semiconductor light-emitting element. Accordingly, in the image display device 1 of the embodiment, the luminance of the light-emitting element 12 is controlled by controlling the duty cycle of the light emission time of the light-emitting element 12 while controlling the current value of the light-emitting element 12 by the analog image PWM circuit 14 and the power supply control circuit 16 of the pixel circuit 10. Therefore, the luminance control can be performed regardless of the temperature characteristics of the light-emitting element 12.

As shown in FIG. 7C, it is known that the chromaticity of a semiconductor light-emitting element changes due to the driving current. In the image display device 1 of the embodiment, the power supply control signal/analog image signal drive circuit 40 includes the memory 48. As described above, voltage setting values that include the correction values for the γ-correction can be set in the memory 48; therefore, the change of the chromaticity due to the current value setting can be suppressed by considering and setting the correction value of the chromaticity due to the current value beforehand. If necessary, even if the light emission characteristics of the light-emitting element 12 and the characteristics of the transistor circuits fluctuate between pixels, the characteristic fluctuation can be corrected by presetting, in the memory 48, the voltage setting values after a correction considering the fluctuation characteristics.

Modification

In the embodiment described above, the power supply control circuit 16 is connected to the high potential side of the analog image PWM circuit 14. The power supply control circuit may be connected to the low potential side of the analog image PWM circuit as long as the power supply control circuit can supply the drive current having the current value set based on the voltage value written by the power supply control signal Ac to the light-emitting element via the analog image PWM circuit.

Figure 8A:
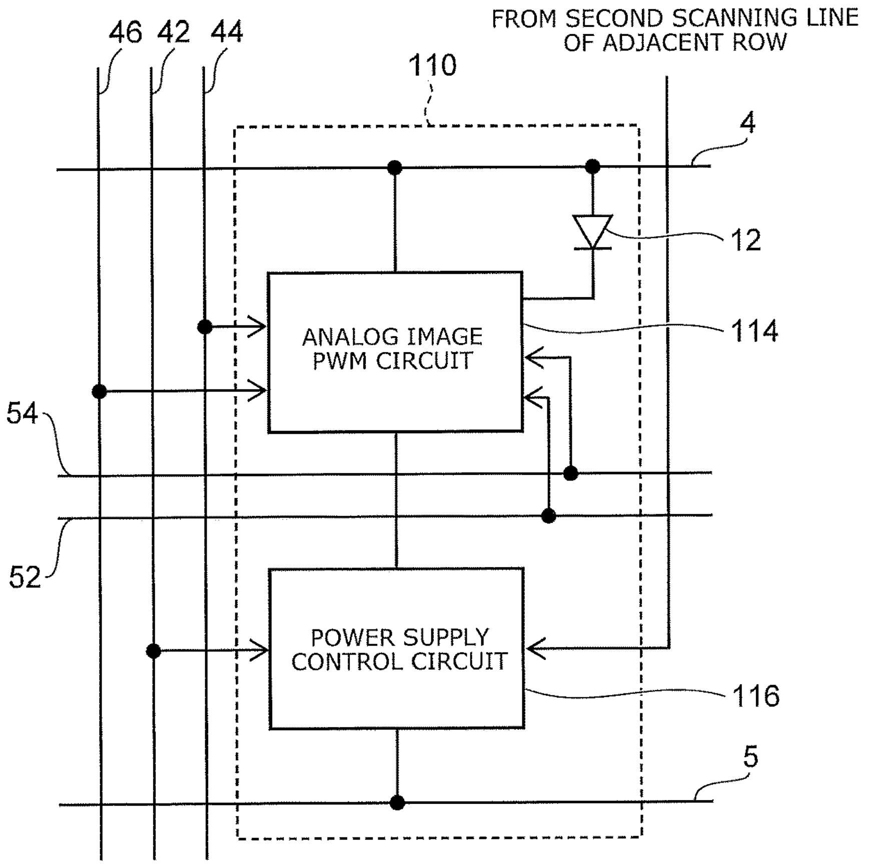
FIG. 8A is a block diagram illustrating the modification of the first embodiment.
Figure 8B:
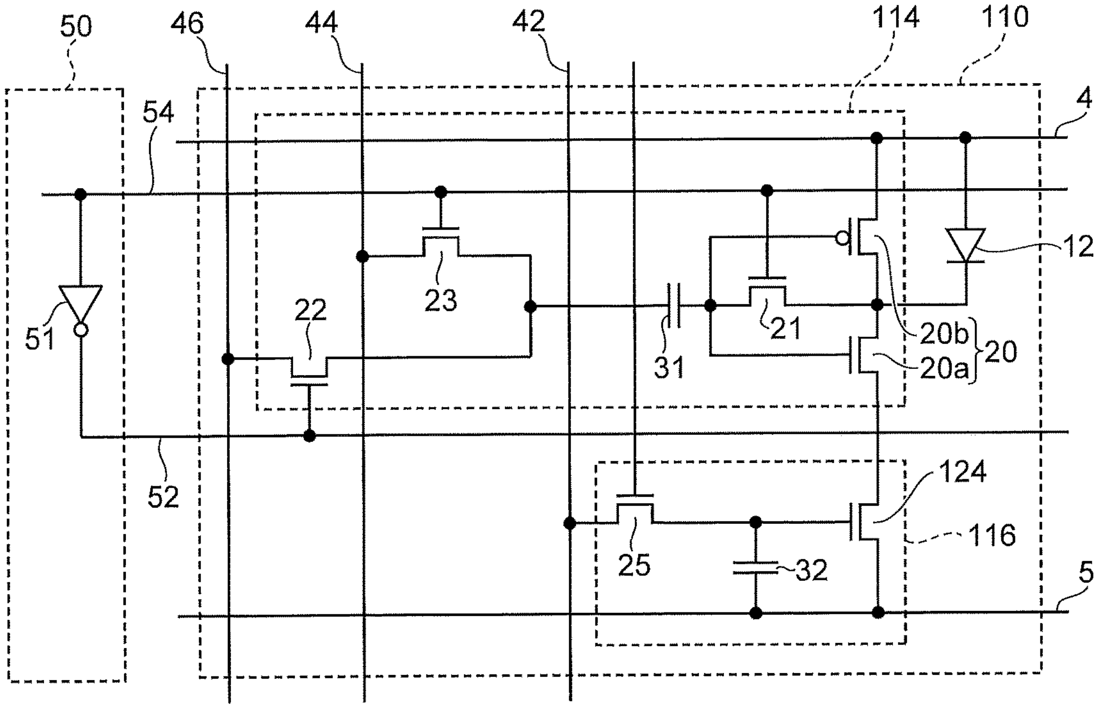
FIG. 8B is a circuit diagram illustrating the modification of the first embodiment.

FIG. 8A is a block diagram illustrating the modification of the first embodiment. FIG. 8B is a circuit diagram illustrating the modification of the first embodiment.

As shown in FIG. 8A, a pixel circuit 110 includes the light-emitting element 12, an analog image PWM circuit 114, and a power supply control circuit 116. The analog image PWM circuit 114 and the power supply control circuit 116 are connected in series between the power supply line 4 and the ground wire 5; and the power supply control circuit 116 is connected on the lower potential side of the analog image PWM circuit 114. The light-emitting element 12 is connected between the power supply line 4 and the output of the analog image PWM circuit 114.

As shown in FIG. 8B, the power supply control circuit 116 includes a fourth transistor 124. The fourth transistor 124 is an n-type transistor. The second capacitor 32 is connected between the ground wire 5 and the control terminal of the fourth transistor 124.

The other components are the same as those of the embodiment described above and are marked with the same reference numerals in the drawings.

Thus, the power supply control circuits 16 and 116 also can be provided on the high potential side or the low potential side of the analog image PWM circuits 14 and 114. Either can be selected according to the convenience of the circuit layout, etc. In the other embodiments described below, similarly to the modification, the power supply control circuit can be provided on the lower potential side of the analog image PWM circuit.

In the description recited above, one end of the light-emitting element 12 is connected to one of the power supply line 4 or the ground wire 5. The number of interconnects can be reduced thereby. Further, an advantage can be obtained in that the voltage that is applied to the light-emitting element 12 is stable even when a voltage drop or a voltage rise occurs in these interconnects due to the current flowing in the power supply line 4 or the ground wire 5. On the other hand, it goes without saying that the one end of the light-emitting element may be connected to another interconnect supplying a prescribed constant voltage according to the efficiency of the circuit layout and other advantages.

Second Embodiment

It is unnecessary to provide the power supply control circuit for each pixel circuit; and the current from a pixel circuit including the power supply control circuit may be supplied to an analog image PWM circuit of a pixel circuit in which the power supply control circuit is not provided.

Figure 9:
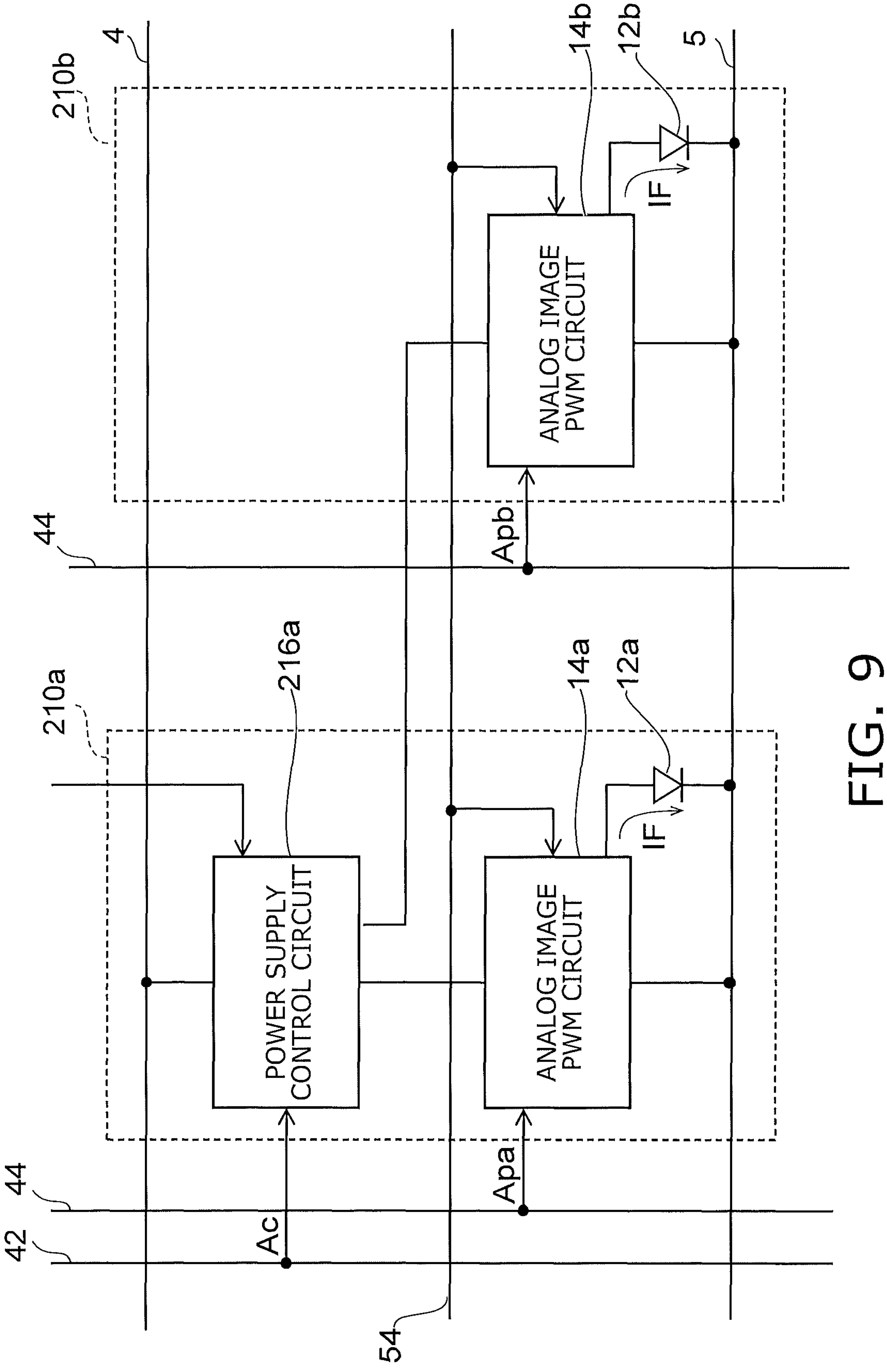
FIG. 9 is a block diagram illustrating a portion of the image display device according to a second embodiment.

FIG. 9 is a block diagram illustrating a portion of the image display device according to the second embodiment.

FIG. 9 shows major portions of two pixel circuits of the image display device. The reference triangular wave signal line, the pixel circuit of the adjacent row, and the second scanning line of the adjacent row are not illustrated in the drawing.

As shown in FIG. 9, a pixel circuit 210*a* includes a power supply control circuit 216*a*, an analog image PWM circuit 14*a*, and a light-emitting element 12*a*. The power supply control circuit 216*a* and the analog image PWM circuit 14*a* are connected in series between the power supply line 4 and the ground wire 5. The light-emitting element 12*a* is connected to the output of the analog image PWM circuit 14*a*. The light-emitting element 12*a* of the pixel circuit 210*a* is driven by a drive current IF having a current value set based on the voltage value of the power supply control signal Ac.

A pixel circuit 210*b* includes an analog image PWM circuit 14*b* and a light-emitting element 12*b*. The analog image PWM circuit 14*b* drives the light-emitting element 12*b* by the supply of the drive current from the power supply control circuit 216*a* of the pixel circuit 210*a* of the adjacent column.

In the case of the first embodiment, the power supply control circuit 16 is a 1T1C circuit including a single fourth transistor 24 and a single second capacitor 32. Conversely, in the case of the embodiment, two fourth transistors 24 are provided in parallel. The source electrodes of the two fourth transistors 24 each are connected to the power supply line 4; and the gate electrodes of the two fourth transistors 24 each are connected to the second capacitor 32. One of the drain electrodes of the two fourth transistors 24 is connected to the analog image PWM circuit 14*a*; and the other is connected to the analog image PWM circuit 14*b*. Accordingly, the drive current IF at this time has the same current value as the drive current IF of the light-emitting element 12*a* of the pixel circuit 210*a* of the adjacent column.

The analog image PWM circuits 14*a* and 14*b* of the pixel circuits 210*a* and 210*b* maintain the lighting state of the light-emitting elements 12*a* and 12*b* in different driving periods set based on analog image signals Apa and Apb. That is, in the embodiment, the luminance setting is performed by changing the driving period of the drive current while sharing the power supply control circuit 216*a* and using equal current values of the drive currents.

The power supply control circuit 16 is not limited to the case of supplying the current to two analog image PWM circuits and may supply the current to three or more analog image PWM circuits. In such a case as well, it is sufficient to set the number of the fourth transistors 24 in parallel to be three or more according to the number of analog image PWM circuits.

According to the embodiment, the configuration of the pixel circuit can be simplified; therefore, the integration can be increased and the display can have high definition commensurately.

Also, simplifying the pixel circuit may contribute to lower costs; and a yield increase is expected.

The unit of the pixel circuits sharing a power supply control circuit can be multiple pixels of the same light emission color. This may contribute to lower costs while avoiding higher complexity of the color balance control.

Third Embodiment

The circuit configuration of the power supply control circuit is not limited to those described above.

Figure 10:
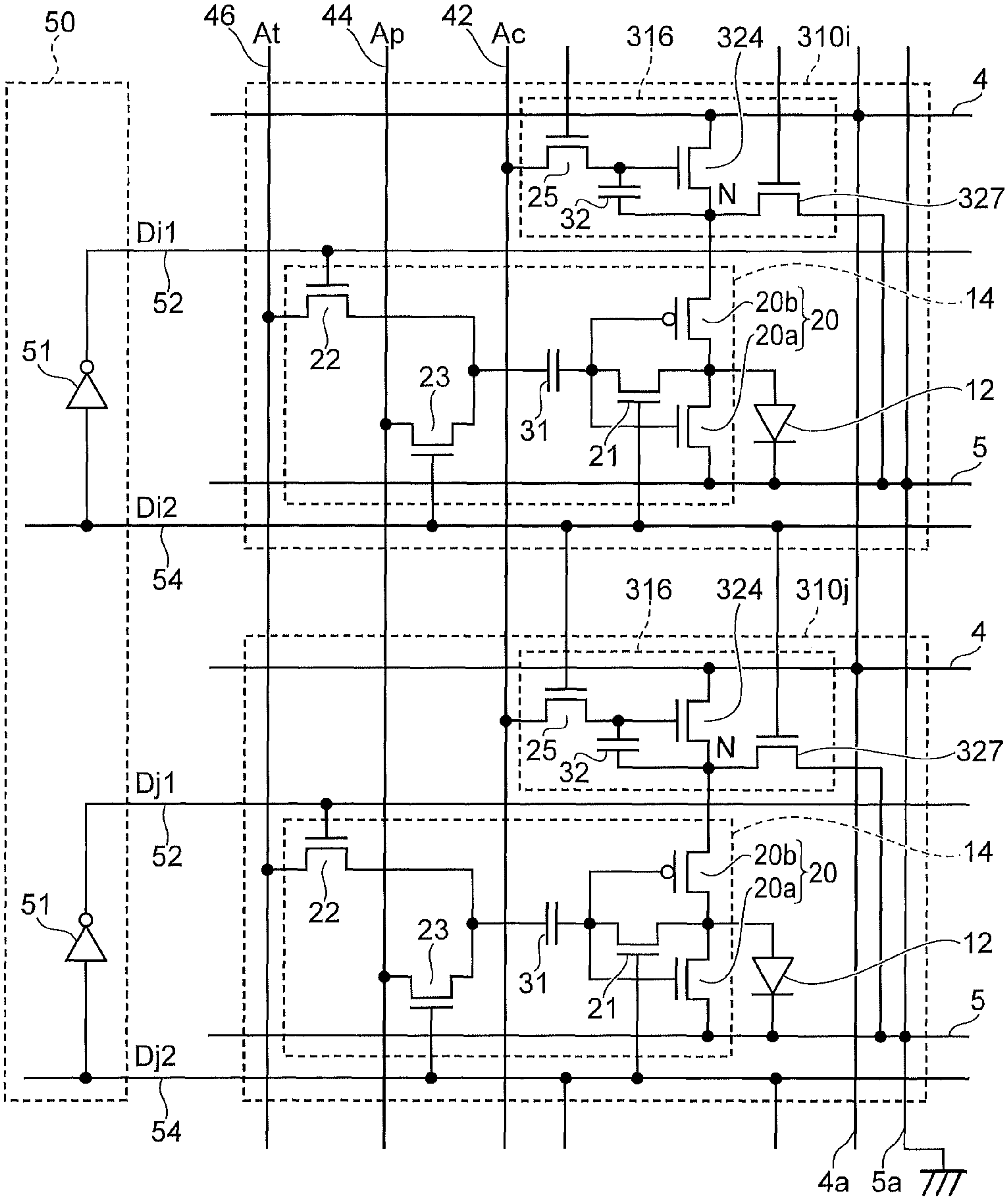
FIG. 10 is a circuit diagram illustrating a portion of an image display device according to a third embodiment.

FIG. 10 is a circuit diagram illustrating a portion of an image display device according to the third embodiment.

Similarly to the embodiments described above, the timing of the writing of the power supply control circuit is determined by the second scanning signal Dig of the second scanning line 54 of the adjacent row. Therefore, FIG. 10 shows pixel circuits 310*i* and 310*j* of adjacent rows. The circuit configurations of the pixel circuits 310*i* and 310*j* are the same; the same circuit components are marked with the same reference numerals; and a detailed description is omitted as appropriate.

As shown in FIG. 10, the pixel circuits 310*i* and 310*j* each include a power supply control circuit 316. The power supply control circuit 316 includes a fourth transistor 324, the fifth transistor 25, a seventh transistor 327, and the second capacitor 32. These three transistors each are n-type transistors.

The main electrodes of the fourth transistor 324 are connected between the power supply line 4 and the inverter 20. The main electrodes of the seventh transistor 327 are connected between the ground wire 5 and a connection node N between the fourth transistor 324 and the inverter 20. The control electrode of the seventh transistor 327 is connected to the control electrode of the fifth transistor 25 and to the second scanning line 54 of the adjacent row. Similarly to the other embodiments described above, the main electrodes of the fifth transistor 25 are connected between the power supply control signal line 42 and the control electrode of the fourth transistor 324. The second capacitor 32 is connected between the fourth transistor 324 and the connection node N.

The fifth transistor 25 is switched ON when the second scanning signal Dig of the second scanning line 54 of the adjacent row becomes the high level. Simultaneously, the seventh transistor 327 also is switched ON; and the connection node N is connected to the ground wire 5. Thereby, the voltage value of the power supply control signal Ac is applied across the second capacitor 32 by the power supply control signal line 42. Thus, the voltage of the power supply control signal can be written to the power supply control circuit 316.

Because the fourth transistor 324 is an n-type transistor, the size of the transistor can be small. Although one n-type transistor is added in the embodiment, there are cases where the occupied surface area can be smaller than in the case where a p-type transistor is used; and an increase of the yield is expected.

Fourth Embodiment

Instead of an analog image PWM circuit, a digital image PWM circuit that uses a subfield image signal may be used.

Figure 11:
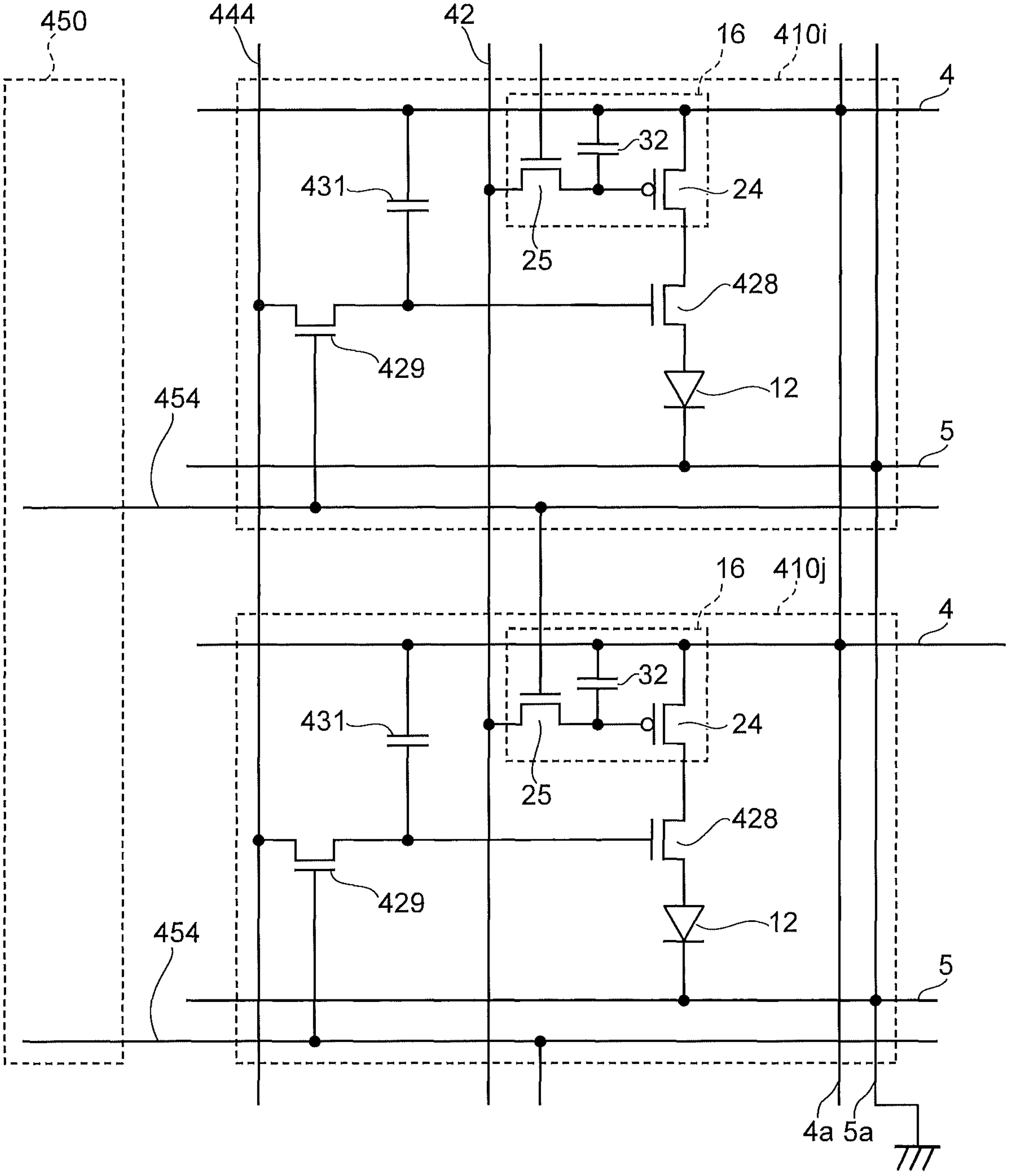
FIG. 11 is a circuit diagram illustrating a portion of an image display device according to a fourth embodiment.

FIG. 11 is a circuit diagram illustrating a portion of an image display device according to the fourth embodiment.

As shown in FIG. 11, the image display device includes multiple pixel circuits 410*i* and 410*j*. Each row of the multiple pixel circuits 410*i* and 410*j* is connected to a scanning line 454. The scanning line 454 extends in the row direction from a scanning circuit 450. Each column of the multiple pixel circuits 410*i* and 410*j* is connected to the power supply control signal line 42. Each column of the multiple pixel circuits 410*i* and 410*j* is connected to a digital image signal line 444. The power supply control signal line 42 and the digital image signal line 444 extend in the column direction.

Each of the multiple pixel circuits 410*i* and 410*j* includes the power supply control circuit 16. The power supply control circuit 16 is the same as those of the other embodiments described above. That is, the voltage value of the power supply control signal is written to the power supply control circuit 16 according to the timing of the scanning signal of the adjacent row supplied from the scanning circuit 450. The power supply control circuit 16 supplies, to the light-emitting element 12 via a drive transistor 428, a drive current having a current value set based on the written voltage value.

The other portions of the multiple pixel circuits 410*i* and 410*j* are digital image PWM circuits. Each digital image PWM circuit includes the drive transistor 428, a select transistor 429, and a capacitor (a first capacitance element) 431. The main electrodes of the drive transistor 428 are connected between the power supply control circuit 16 and the light-emitting element 12. The main electrodes of the select transistor 429 are connected between the digital image signal line 444 and the control electrode of the drive transistor 428. The capacitor 431 is connected between the power supply line 4 and the control electrode of the drive transistor 428.

In a pixel circuit employing a digital image PWM circuit, the display control of the image is performed based on splitting the image data of one frame of the screen into image data of multiple, e.g., eight subfield screens. One frame of image data is split and distributed to the subfield screens by luminance; and the luminance of one frame is reproduced according to which of the eight subfield screens is selected by the digital image PWM circuit.

The digital image signal data that is supplied to the pixel circuits 410*i* and 410*j* via the digital image signal line 444 is set to "1" or "0" according to the selected subfield. The select transistor 429 is selected by the scanning signal and writes the value of the digital image signal line 444 at that time to the capacitor 431. When "1" is written to the capacitor 431, the drive transistor 428 supplies, to the light-emitting element 12, the drive current set by the power supply control circuit 16. When "0" is written to the capacitor 431, the drive transistor 428 is OFF; and a current is not supplied to the light-emitting element 12.

Thus, by introducing the power supply control circuit not only to a pixel circuit using analog image PWM circuit but also to a pixel circuit using a digital image PWM circuit, the luminance that is settable by the digital image PWM circuit can be set in more detail. Therefore, higher definition of the image display device is possible.

In the pixel circuit using the digital image PWM circuit, the circuit configuration can be simpler. This can contribute to lower costs and increase the yield of the image display device.

Fifth Embodiment

Figure 12:
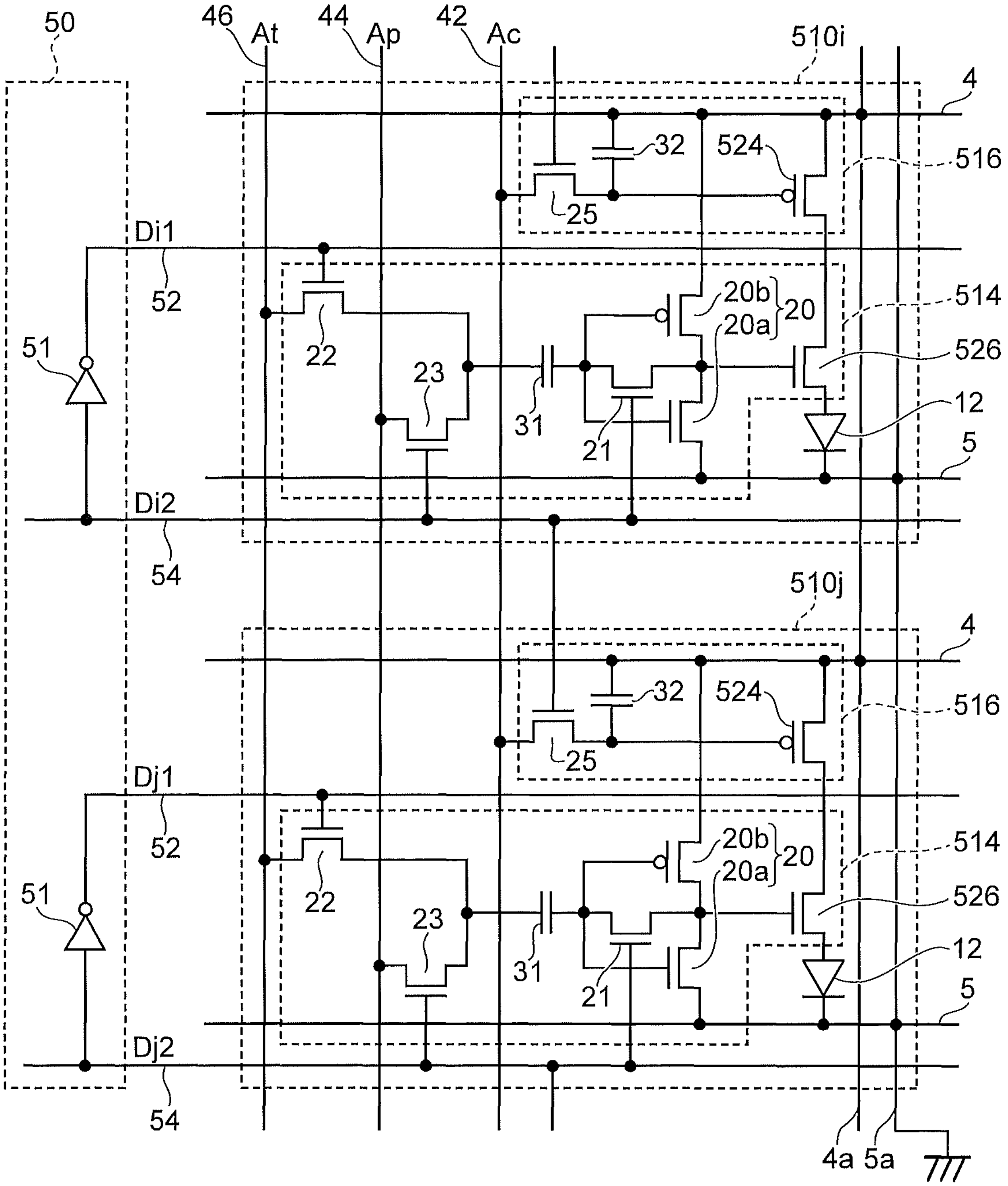
FIG. 12 is a circuit diagram illustrating a portion of an image display device according to a fifth embodiment.

FIG. 12 is a circuit diagram illustrating a portion of an image display device according to the fifth embodiment.

In the embodiment, the configuration of the output stage of the analog PWM circuit and the power supply control circuit is different from those of the other embodiments described above. Otherwise, the image display device of the embodiment is the same as those of the other embodiments described above; the same components are marked with the same reference numerals; and a detailed description is omitted as appropriate.

As shown in FIG. 12, each of pixel circuits 510*i* and 510*j* includes an analog image PWM circuit 514 and a power supply control circuit 516. The analog image PWM circuit (the first circuit) 514 includes a sixth transistor 526. The main electrodes of the sixth transistor 526 are connected between the light-emitting element 12 and the power supply control circuit (the second circuit) 516. The control terminal of the sixth transistor 526 is connected to the output of the inverter 20.

In the embodiment, the inverter 20 is connected between the power supply line 4 and the ground wire 5; and the power supply control circuit is not connected between the inverter 20 and the power supply line 4. That is, the sixth transistor 526 functions as an output buffer for the inverter 20.

The power supply control circuit 516 includes a fourth transistor 524. The main electrodes of the fourth transistor 524 are connected between the power supply line 4 and the sixth transistor 526. The fourth transistor 524 is a p-type transistor and is connected to the fifth transistor 25 and the second capacitor 32 similarly to the other embodiments described above (the first embodiment, etc.).

In the embodiment, the analog image signal is not affected by the power supply control signal because the power supply that is supplied to the inverter 20 of the analog image PWM circuit 514 is separated from the output of the power supply control circuit 516. Therefore, the precision of the gradation of the analog display set by the analog image PWM circuit 514 can be sufficiently high.

Sixth Embodiment

Figure 13:
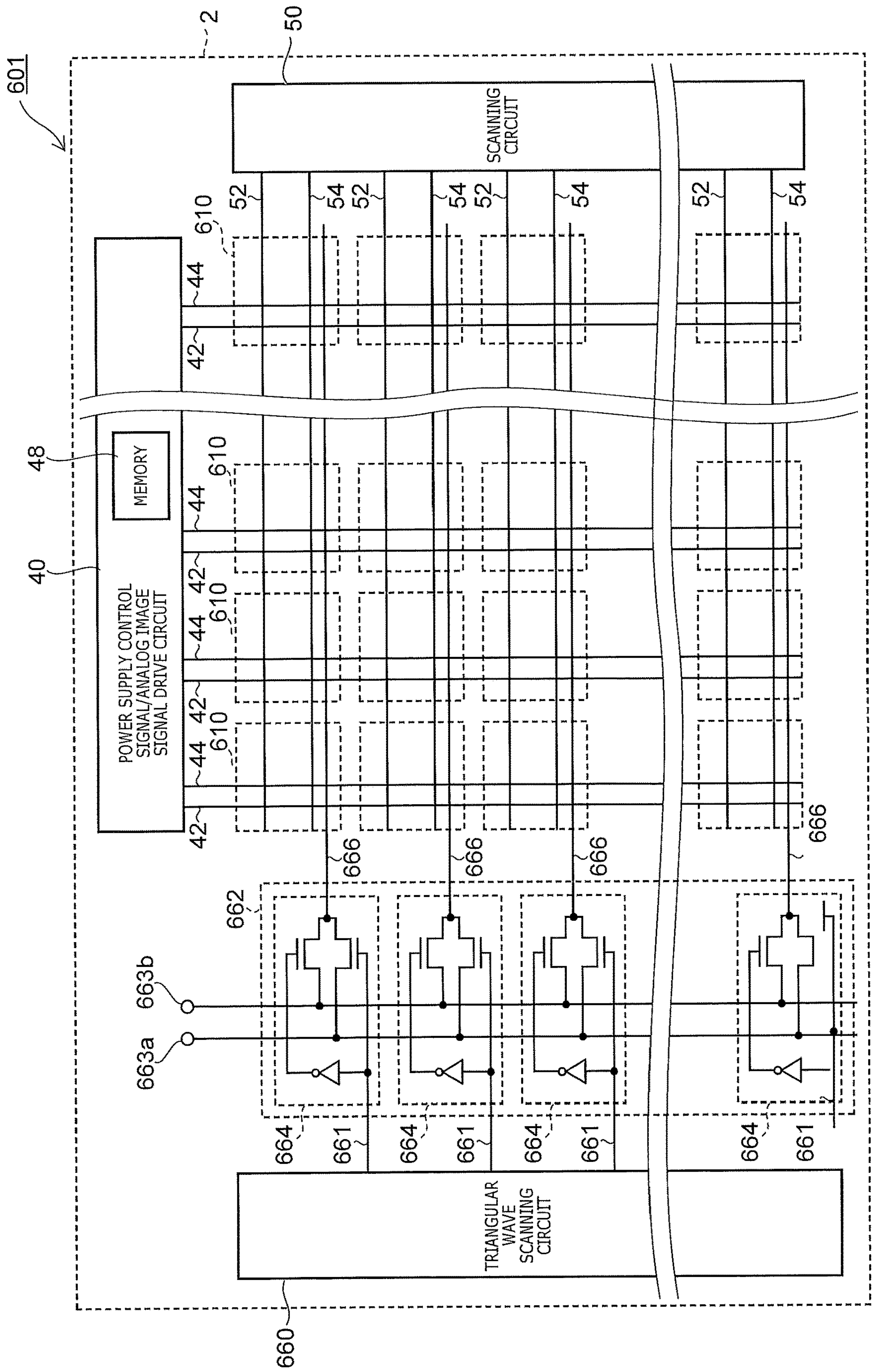
FIG. 13 is a block diagram illustrating an image display device according to a sixth embodiment.

FIG. 13 is a block diagram illustrating an image display device according to the sixth embodiment.

As shown in FIG. 13, an image display device 601 of the embodiment includes the substrate 2 and multiple pixel circuits 610 similarly to the other embodiments described above. The image display device 601 further includes a triangular wave scanning circuit 660 and a reference signal selection circuit 662. The image display device 601 of the embodiment differs from the other embodiments described above in that the triangular wave scanning circuit 660 and the reference signal selection circuit 662 are included. Otherwise, the image display device 601 is the same as those of the other embodiments described above; the same component are marked with the same reference numerals; and a detailed description is omitted as appropriate.

The triangular wave scanning circuit 660 is provided in a column at the left end of the column at the leftmost end of the pixel circuits 610 arranged in the matrix configuration. In the example, the scanning circuit 50 is provided in a column on the right side of the column at the rightmost end of the pixel circuits 10 arranged in the matrix configuration. The arrangement of the triangular wave scanning circuit 660 and the scanning circuit 50 may be the reverse of the example.

The reference signal selection circuit (the selection circuit) 662 is provided between the triangular wave scanning circuit 660 and the multiple pixel circuits 610 arranged in the matrix configuration. The reference signal selection circuit 662 includes a selector 664 for each row of the pixel circuits 10. The triangular wave scanning circuit 660 includes a triangular wave scanning signal line 661 for each row of the pixel circuits 610; and the triangular wave scanning signal lines 661 are connected respectively to the selectors 664. The selector 664 includes a reference signal line 666 for each row of the pixel circuits 610. The reference signal line 666 extends in the row direction.

The reference signal selection circuit 662 is connected to a reference triangular wave signal line 663*a* and a high-voltage signal line 663*b*. The reference triangular wave signal line 663*a* and the high-voltage signal line 663*b* are connected to each selector 664.

The reference triangular wave signal is input to the reference triangular wave signal line 663*a*. Although the reference triangular wave signal is, for example, the reference triangular wave signal At in the other embodiments described above, here, the reference triangular wave signal is a signal having a symmetric triangular wave of the frequency of one horizontal scanning period as described below.

A high-voltage signal is input to the high-voltage signal line 663*b*. The high-voltage signal is a signal having a direct current voltage of a voltage value higher than the maximum voltage value of the reference triangular wave signal.

Figure 14:
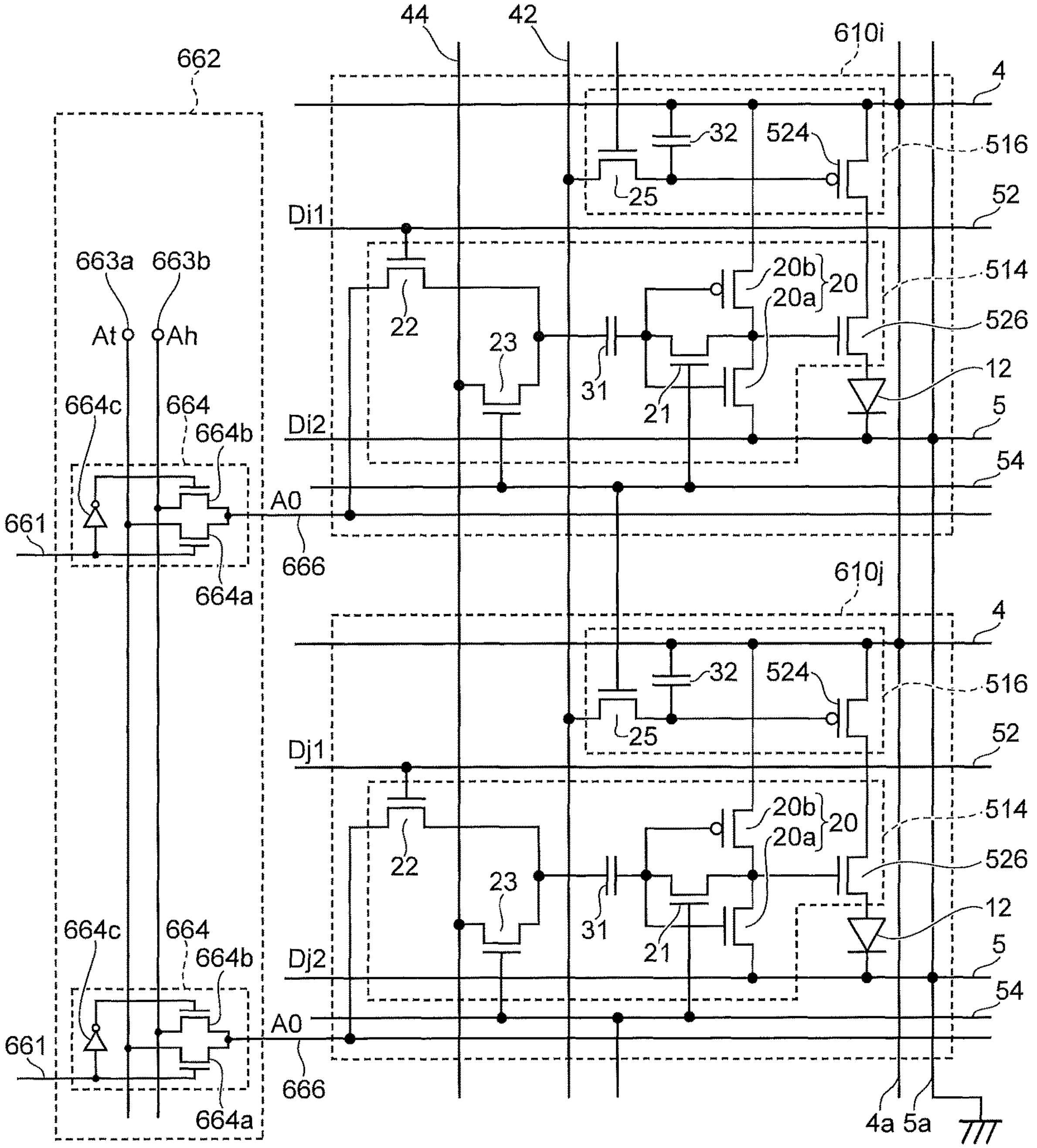
FIG. 14 is a circuit diagram illustrating a portion of the image display device of the sixth embodiment.

FIG. 14 is a circuit diagram illustrating a portion of the image display device of the sixth embodiment.

As shown in FIG. 14, pixel circuits 610*i* and 610*j* have the same circuit configurations as the pixel circuits 510*i* and 510*j* of the fifth embodiment described above. The pixel circuits 610*i* and 610*j* differ from the pixel circuits 510*i* and 510*j* in that a main electrode of the second transistor 22 is connected to the reference signal line 666. Otherwise, the embodiment is the same as the fifth embodiment; the same components are marked with the same reference numerals; and a detailed description is omitted as appropriate.

The selector 664 includes two switches 664*a* and 664*b* and an inverter 664*c*. The switch 664*a* is connected between the reference triangular wave signal line 663*a* and the reference signal line 666. The switch 664*b* is connected between the high-voltage signal line 663*b* and the reference signal line 666. The triangular wave scanning signal line 661 is connected to the control electrode of the switch 664*a*, and is connected to the control electrode of the switch 664*b* via the inverter 664*c*.

When the triangular wave scanning signal supplied from the triangular wave scanning circuit 660 is the high level, the selector 664 selects the reference triangular wave signal and supplies the reference triangular wave signal to the pixel circuit 610*i* or 610*j*. When the triangular wave scanning signal is the low level, the selector 664 selects the high-voltage signal and supplies the high-voltage signal to the pixel circuit 610*i* or 610*j*.

In the pixel circuits 610*i* and 610*j*, the threshold that is based on the voltage value of the analog image signal Ap written to the analog image PWM circuit 514 can be set in a range from the minimum voltage value to the maximum voltage value of the reference triangular wave signal At. On the other hand, the voltage value of a high-voltage signal Ah is set to a voltage value higher than the maximum voltage value of the reference triangular wave signal At.

When the reference triangular wave signal At is selected, as described in the other embodiments described above, the light-emitting element 12 emits light when the threshold that is set based on the voltage value written to the analog image PWM circuit 514 and is compared to the reference triangular wave signal At exceeds the voltage value of the reference triangular wave signal At.

When the high-voltage signal Ah is input to the analog image PWM circuit 514, the threshold that is based on the voltage value written to the analog image PWM circuit 514 is always lower than the voltage value of the high-voltage signal Ah. Accordingly, in such a case, the light-emitting element 12 does not emit light.

That is, in the embodiment, the light emission of the light-emitting element 12 is stopped forcibly for a designated row, that is, for a designated horizontal scanning period, by the triangular wave scanning signal output by the triangular wave scanning circuit 660. The luminous efficiency of the light-emitting element of the image display device is set to an optimal value thereby.

The operation of the image display device of the embodiment will now be described in detail.

Figure 15:
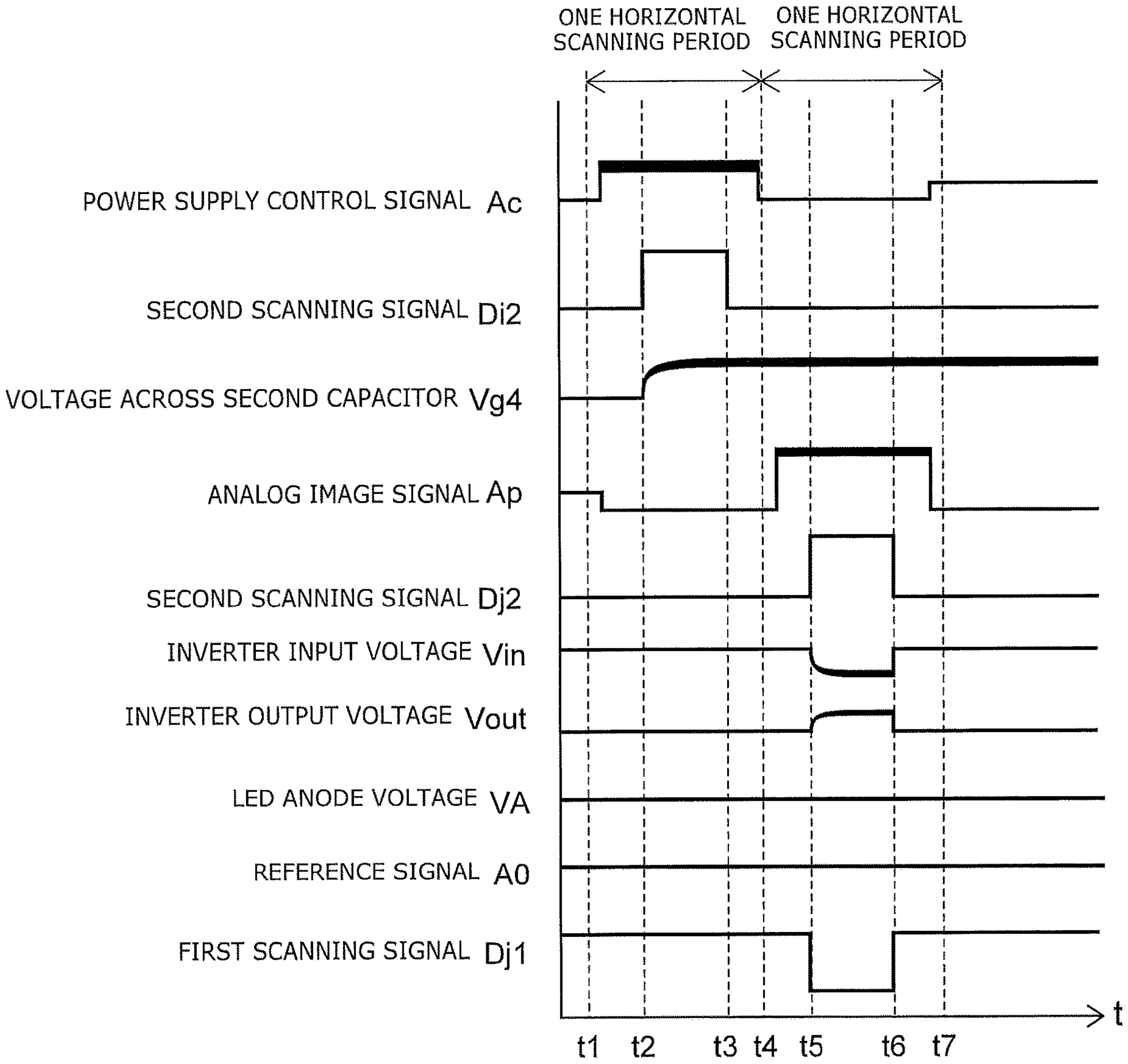
FIG. 15 and FIG. 16 are examples of timing charts for describing the operation of the image display device according to the sixth embodiment.
Figure 16:
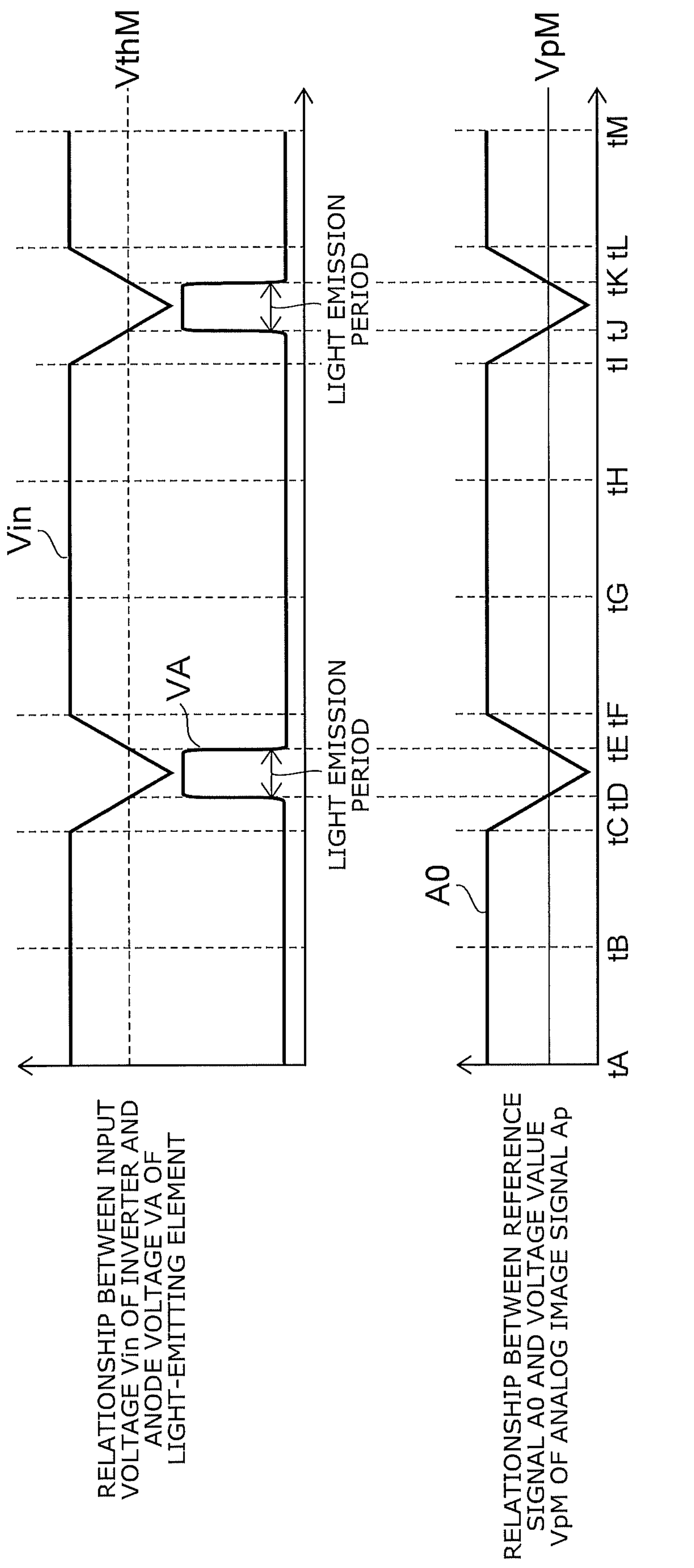

FIG. 15 and FIG. 16 are examples of timing charts for describing the operation of the image display device according to the sixth embodiment.

FIG. 15 is a timing chart showing the period of writing the voltage value of the power supply control signal Ac to the power supply control circuit 516 and the period of writing the voltage value of the analog image signal Ap to the analog image PWM circuit 514; and the figures from the uppermost level to the fifth level are the same as those of FIG. 4.

The figures of the sixth level and the seventh level of FIG. 15 show the temporal change of the input voltage and the output voltage of the inverter 20; and the voltage values that are written are different from those of FIG. 4.

The figure of the eighth level of FIG. 15 shows the temporal change of the voltage of the anode electrode of the light-emitting element 12.

The figure of the ninth level of FIG. 15 shows the temporal change of a reference signal AO output from the reference signal line 666.

The figure of the lowermost level of FIG. 15 shows the temporal change of the first scanning signal Dj1 output from the first scanning line 52.

As shown in the figures from the uppermost level to the seventh level in FIG. 15, similarly to the other embodiments described above, the voltage value of the power supply control signal Ac is written to the power supply control circuit 516 in the period between the time t1 to t4; and the voltage value of the analog image signal Ap is written to the analog image PWM circuit 514 in the period between the time t4 to t7.

Here, in the example of FIG. 15, for the entire period shown in the figure of the ninth level, the selector 664 selects the high-voltage signal line 663*b*; and the reference signal AO has the voltage value of the high-voltage signal Ah.

As shown in the figures of the eighth level and the lowermost level of FIG. 15, between the time t1 to t5 and from the time t6 onward, even when the first scanning signal Dj1 becomes the high level, the output voltage Vout of the inverter 20 of the pixel circuit 610*j* is the low level; a voltage that is the threshold or more is not applied to the anode electrode of the light-emitting element 12; and the light emission of the light-emitting element 12 is prohibited.

When the reference triangular wave signal At is selected by the selector 664, the light-emitting element 12 emits light at a timing corresponding to the threshold set based on the voltage value written to the analog image PWM circuit 514 as in the example of FIG. 4.

FIG. 16 shows a timing chart of a period including multiple horizontal scanning periods. The time tA to tB, tB to tC, tC to tF, tF to tG, tG to tH, tH to tI, tI to tL, and tL to tM each are horizontal scanning periods; and a total of eight horizontal scanning periods are shown in FIG. 16.

The upper figure of FIG. 16 shows the temporal change of the input voltage Vin of the inverter 20 and an anode voltage VA of the light-emitting element 12. This figure also shows an inverted intermediate voltage VthM of the inverter 20; and this inverted intermediate voltage is the threshold voltage of the analog image PWM circuit 514 written by the analog image signal Ap.

The lower figure of FIG. 16 shows the relationship between the reference signal AO and an analog image signal voltage VpM written to the analog image PWM circuit 514.

As shown in FIG. 16, the selector 664 selects the high-voltage signal Ah in the period between the time to to tC. Therefore, the light emission of the light-emitting element 12 is prohibited regardless of the voltage value written to the analog image PWM circuit 514.

In the period between the time tC to tF, the light-emitting element 12 emits light at a timing (the period between the time tD to tE) based on the voltage value written to the analog image PWM circuit 514. The current that is supplied to the light-emitting element 12 in this period is set based on the voltage value written to the power supply control circuit 516. As described above, the interval of the symmetric triangular wave signal is set to one horizontal scanning period. In the embodiment, the frequency of the triangular wave signal is increased to one horizontal scanning period to provide the light emission period periodically; thereby, the occurrence of flickering caused by the interference between the ON-state and the triangular wave signal can be avoided. Accordingly, the frequency of the triangular wave signal is not limited to one horizontal scanning period and may be a natural number multiple of the horizontal scanning period.

In the period between the time tF to tI, the light emission of the light-emitting element 12 is prohibited similarly to the period between the time tA to tC.

In the period between the time tI to tL, the light-emitting element 12 emits light similarly to the period between the time tC to tF; and in the period between the time tL to tM, the light emission of the light-emitting element 12 is prohibited similarly to the period between the time tA to tC. Although the threshold voltage compared to the reference signal AO is constant in the example of the figures, in the normal operation of the image display device, for example, a different voltage value may be rewritten for each vertical scanning period. The voltage value that is written to the power supply control circuit also may be rewritten, for example, for each vertical scanning period. Accordingly, it goes without saying that the light emission period within one horizontal scanning period is modulated when such rewriting is performed.

Although the light emission of the light-emitting element 12 is switched alternately between three horizontal scanning periods of the light emission prohibition and one horizontal scanning period of the light emission in the example described above, the light emission and the light emission prohibition of the light-emitting element 12 may be switched at any timing. For example, the light emission of the light-emitting element 12 may be permitted every two horizontal scanning periods, the light-emitting element 12 may emit light every other row, etc.

Actions and effects of the image display device 601 of the embodiment will now be described.

The image display device 601 of the embodiment include the triangular wave scanning circuit 660 and the reference signal selection circuit 662. The reference signal selection circuit 662 can switch between the reference triangular wave signal At and the high-voltage signal Ah supplied to each pixel circuit 610 based on the triangular wave scanning signal from the triangular wave scanning circuit 660. Therefore, according to the triangular wave scanning signal, the light emission and the light emission prohibition of the light-emitting element 12 of each pixel circuit 610 can be selectively set for each horizontal scanning period or vertical scanning period.

Figure 17:
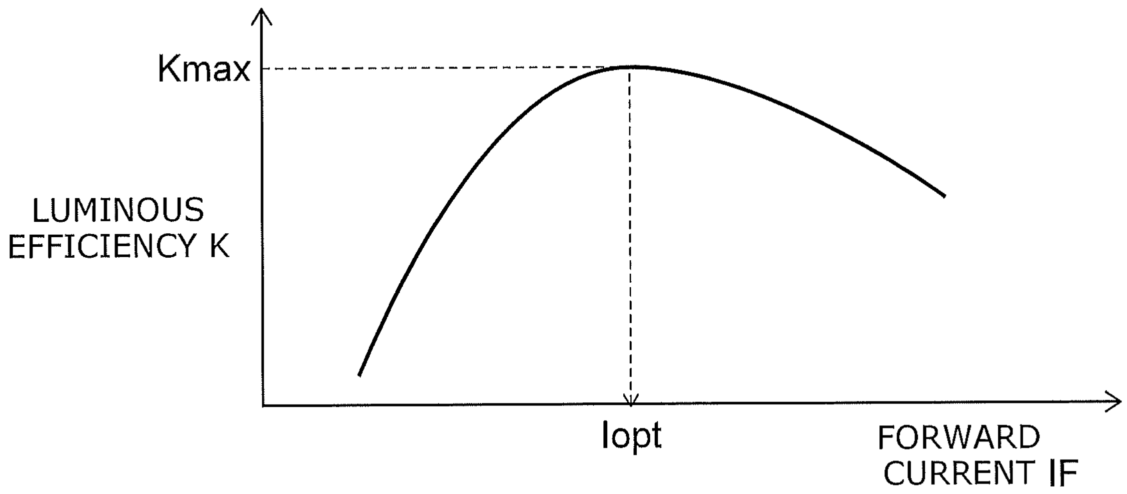
FIG. 17 is a graph illustrating a characteristic of the light-emitting element.

FIG. 17 is a graph illustrating a characteristic of the light-emitting element.

FIG. 17 is a graph of a luminous efficiency characteristic example of an inorganic semiconductor light-emitting element used as the light-emitting element. The horizontal axis of the graph is a forward current IF (A) flowing in the light-emitting element and is a logarithmic axis. The vertical axis of the graph is a luminous efficiency K (lm/W).

As shown in FIG. 17, the inorganic semiconductor light-emitting element has a maximum value Kmax of the luminous efficiency for the forward current IF. That is, an optimal value Iopt of the forward current IF exists at the maximum value Kmax of the luminous efficiency; and the light emission power of the image display device can be optimized by controlling the light-emitting element included in the image display device to be at the optimal value Iopt.

On the other hand, for a light-emitting element using a normal inorganic semiconductor light-emitting element, there are cases where the luminance becomes too high when the light-emitting element is driven at the optimal value Iopt. Generally, the optimal value Iopt has a value of about 1 to 100 μA. On the other hand, the appropriate maximum luminance of a panel for an image display device including a mobile mid-sized panel is 1000 cd/m$^2$ or less. Accordingly, if such a current value is applied to a panel of a mobile application, the luminance is several times to several hundred times the appropriate luminance; and the luminance is too high.

Therefore, in the image display device 601 of the embodiment, by prohibiting the light emission of the light-emitting element 12 selectively by horizontal scanning period, the power consumption can be optimized while suppressing the luminance of the panel. When providing the horizontal scanning periods that emit light to be temporally uniform, the example has an advantage that the occurrence of flickering can be prevented because the in-plane light emission luminance is uniform at any instant because the multiple rows that emit light are scanned sequentially and uniformly in the screen. Also, when continuously providing the horizontal scanning periods that emit light, the multiple rows that emit light are scanned as a grouped band in the screen; therefore, an advantage is provided in that a display having a high video image resolution such as that of a cathode-ray tube (CRT) can be realized.

Modification

Figure 18:
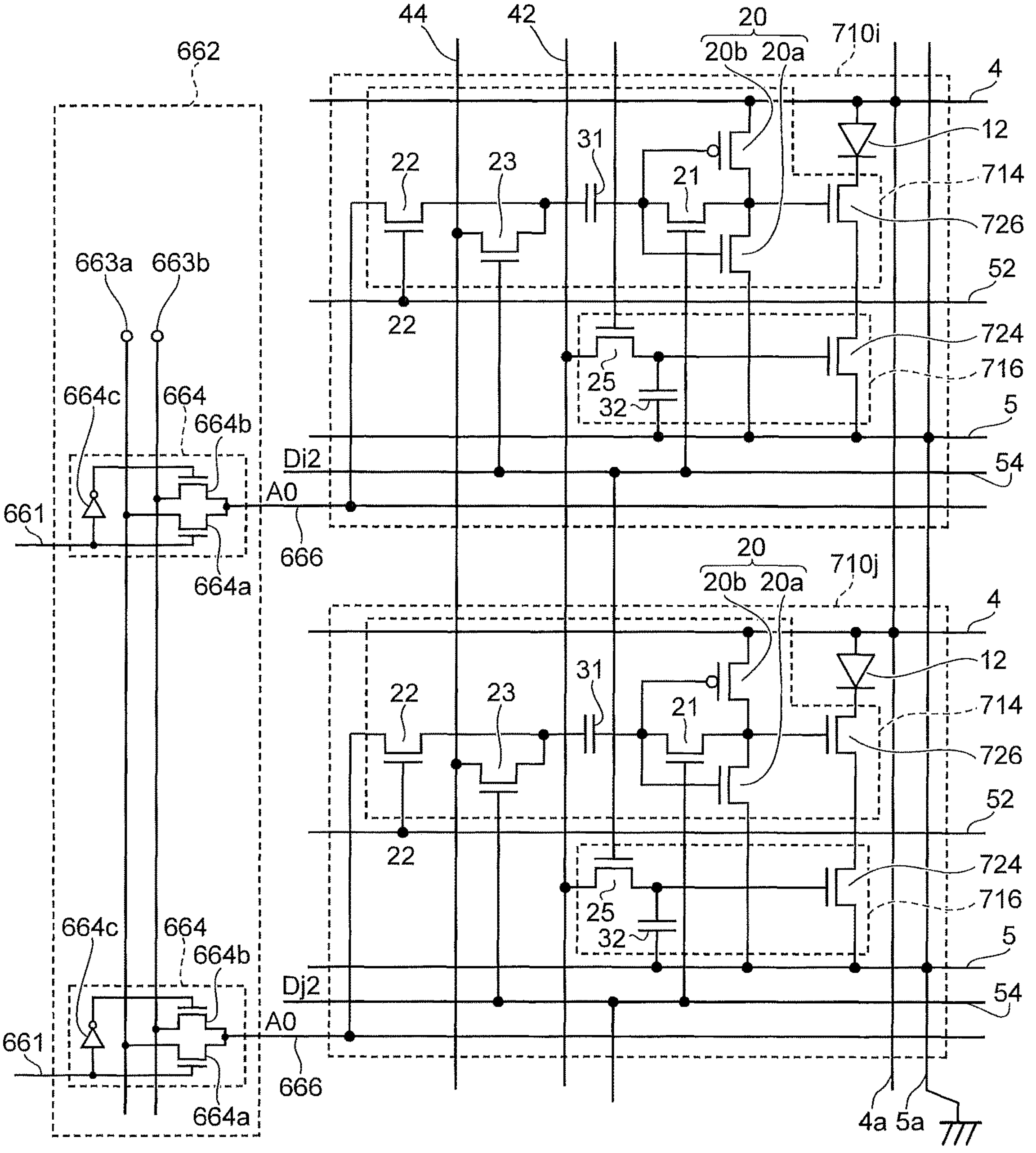
FIG. 18 is a circuit diagram illustrating a portion of an image display device according to a modification of the sixth embodiment.

FIG. 18 is a circuit diagram illustrating a portion of an image display device according to a modification of the sixth embodiment.

In the embodiment as well, the power supply control circuit may be provided on the high potential side or the low potential side of the analog image PWM circuit.

As shown in FIG. 18, each of pixel circuits **710*i* and 710*j* includes an analog image PWM circuit 714 and a power supply control circuit 716 connected in series between the power supply line 4 and the ground wire 5. The power supply control circuit (the second circuit) 716 is connected on the lower potential side of the analog image PWM circuit (the first circuit) 714**.

The output of the inverter 20 of the analog image PWM circuit is connected to the control terminal of a sixth transistor 726. The sixth transistor 726 is connected between the light-emitting element 12 and a fourth transistor 724 of the power supply control circuit 716.

The control terminal of the fourth transistor 724 is connected to one main electrode of the fifth transistor 25. The second capacitor 32 is connected between the ground wire 5 and the control electrode of the fourth transistor 724.

Thus, in the sixth embodiment as well, either connection position of the power supply control circuit and the analog image PWM circuit can be selected according to the convenience of the circuit layout, etc.

According to the embodiments described above, an image display device that drives a light-emitting element with a wide dynamic range suited to a HDR image display can be provided.

The embodiments described above are examples embodying the invention; and the invention is not limited to the embodiments. Embodiments obtained by appropriate design modifications of the embodiments described above made by one skilled in the art also are within the scope of the invention to the extent that the spirit of the invention is included.

Obviously, numerous modifications and variations of the present invention are possible in light of the above teachings. It is therefore to be understood that within the scope of the appended claims, the invention may be practiced otherwise than as specifically described herein.

What is claimed is:

1. An image display device comprising:

a plurality of driving circuits disposed on a substrate; and a plurality of light emitting elements corresponding to a plurality of pixels respectively, each of the plurality of driving circuits being configured to provide a driving current to each of the plurality of light emitting elements and to control the driving current by a pulse amplitude modulation and a pulse width modulation, the driving circuit being configured using TFTs.

2. The image display device according to claim 1, wherein each of the driving circuits includes a LTPS-TFT.

3. The image display device according to claim 1, wherein each of the driving circuits includes an oxide-TFT.

4. The image display device according to claim 1, wherein the plurality of light emitting elements include inorganic semiconductors respectively.

5. The image display device according to claim 1, wherein the plurality of light emitting elements include Group III-V compound semiconductors respectively.

6. The image display device according to claim 1, wherein the plurality of light emitting elements include EL quantum dot elements respectively.

7. The image display device according to claim 1, wherein each of the driving circuits includes a PWM section that performs the pulse width modulation and a PAM section that performs the pulse amplitude modulation, wherein the PWM section includes an inverter.

8. The image display device according to claim 7, wherein the inverter includes a switch element that is capable to short-circuit between an input of the inverter and an output of the inverter.

9. The image display device according to claim 7, wherein the inverter is connected to a reference triangular wave signal line that is input a reference triangular wave signal for the pulse width modulation.

10. The image display device according to claim 9, wherein the reference triangular wave signal is one of a sawtooth wave or an inverted sawtooth wave.

11. The image display device according to claim 9, wherein the reference triangular wave signal has a γ-characteristic.

12. The image display device according to claim 1, further comprising:

a signal voltage writing circuit to set a first signal voltage value representing a gradation of the pulse width modulation and a second signal voltage value representing a gradation of the pulse amplitude modulation, the first signal voltage value and the second signal voltage value being assigned to each of the driving circuits, wherein a number of combinations of levels of the first signal voltage value and levels of the second signal voltage value is larger than a number of levels of the gradation of the pulse width modulation and larger than a number of levels of the gradation of the pulse amplitude modulation.

13. The image display device according to claim 1, further comprising:

a correction circuit configured to correct at least one out of characteristics of the light emitting elements and characteristics of the driving circuits.

14. The image display device according to claim 1, wherein a plurality of cathode electrodes of the light emitting elements are connected to a ground line.

15. The image display device according to claim 1, wherein a plurality of anode electrodes of the light emitting elements are connected to a direct current power line.

* * * * *